United States Patent
Tsuda et al.

(10) Patent No.: US 7,362,939 B2
(45) Date of Patent: Apr. 22, 2008

(54) OPTICAL FIBER FOR LONG PERIOD GRATING, LONG PERIOD GRATING COMPONENT AND MANUFACTURING METHOD OF THE SAME

(75) Inventors: Toshiaki Tsuda, Tokyo (JP); Yasuo Uemura, Tokyo (JP); Keiichi Aiso, Tokyo (JP); Takeshi Yagi, Tokyo (JP); Yukio Niino, Tokyo (JP); Kazuhiko Nishiyama, Tokyo (JP); Hiroshi Kobayashi, Tokyo (JP)

(73) Assignee: The Furukawa Electric Co., Ltd. (JP)

( * ) Notice: Subject to any disclaimer, the term of this patent is extended or adjusted under 35 U.S.C. 154(b) by 0 days.

(21) Appl. No.: 11/349,871

(22) Filed: Feb. 8, 2006

(65) Prior Publication Data
US 2006/0140559 A1 Jun. 29, 2006

Related U.S. Application Data

(62) Division of application No. 10/317,909, filed on Dec. 11, 2002, now abandoned.

(30) Foreign Application Priority Data

| Dec. 13, 2001 | (JP) | ............................ 2001-379856 |
| May 7, 2002 | (JP) | ............................ 2002-131906 |
| May 7, 2002 | (JP) | ............................ 2002-131920 |
| Sep. 6, 2002 | (JP) | ............................ 2002-260925 |

(51) Int. Cl.
*G02B 6/02* (2006.01)
*G02B 6/036* (2006.01)
*G02B 6/34* (2006.01)

(52) U.S. Cl. .................. 385/126; 385/37; 385/123; 385/124; 385/127; 385/128; 385/141; 385/142; 385/144

(58) Field of Classification Search .................. 385/37, 385/123, 124, 126–128, 141, 142, 144
See application file for complete search history.

(56) References Cited

U.S. PATENT DOCUMENTS 4,815,079 A  3/1989  Snitzer et al.

(Continued)

FOREIGN PATENT DOCUMENTS

EP  1 148 359 A1  10/2001

(Continued)

OTHER PUBLICATIONS

Notice of Reasons for Rejection for Patent Application 2002-131920 mailed Oct. 17, 2006.

(Continued)

*Primary Examiner*—Frank G. Font
*Assistant Examiner*—Derek L. Dupuis
(74) *Attorney, Agent, or Firm*—Cantor Colburn LLP

(57) ABSTRACT

This invention relates to an optical fiber for long period grating (LPG), LPG components, and manufacturing method of LPG used as a mode coupler, an optical filter, etc. The optical fiber for LPG comprises a core layer, a first cladding layer that surrounds said core layer and transmits the cladding modes, and a second cladding layer that surrounds said first cladding layer and confines the optical signal of the cladding mode within said first cladding layer. The LPG component comprises an optical fiber for LPG, a coating reinforcement to cover and reinforce said optical fiber for LPG. The manufacturing method of LPG comprises a step of preparation of an optical fiber, a step of constructing the LPG on a predetermined region in said core of said optical fiber by irradiating laser light on said region over a predetermined period corresponding to the LPG, on the predetermined part of said optical fiber, and a step which covers and reinforces said grating region.

5 Claims, 24 Drawing Sheets

U.S. PATENT DOCUMENTS

| | | |
|---|---|---|
| 5,703,978 A | 12/1997 | DiGiovanni et al. |
| 6,004,703 A | 12/1999 | Jang et al. |
| 6,233,379 B1 | 5/2001 | Kim et al. |
| 2002/0109907 A1* | 8/2002 | Chen et al. ................. 359/337 |

FOREIGN PATENT DOCUMENTS

| | | |
|---|---|---|
| JP | 7-56041 | 3/1995 |
| JP | 9-145941 | 6/1997 |
| JP | 10-319259 | 12/1998 |
| JP | 11-119041 | 4/1999 |
| JP | 11-202113 | 7/1999 |
| JP | 11-326671 | 11/1999 |
| JP | 2000-292629 | 10/2000 |
| JP | 2001-124941 | 5/2001 |
| JP | 2001-194539 | 7/2001 |
| JP | 2001-305355 | 10/2001 |

OTHER PUBLICATIONS

Final Notice of Reasons for Rejection for Patent Application 2002-131920 mailed Feb. 6, 2007.

Notice of Reasons for Rejection for Patent Application No. 2001-379856 mailed Aug. 1, 2006.

Final Notice of Reasons for Rejection for Patent Application No. 2001-379856 mailed May 15, 2007.

* cited by examiner

OPTICAL FIBER FOR LONG PERIOD GRATING, LONG PERIOD GRATING COMPONENT AND MANUFACTURING METHOD OF THE SAME

CROSS REFERENCE TO RELATED APPLICATION

This application is a divisional application of U.S. patent application Ser. No. 10/317,909, filed on Dec. 11, 2002 now abandoned, the content of which is incorporated by reference herein in their entirety.

FIELD OF THE INVENTION

This invention relates to an optical fiber for long period grating (LPG), LPG components, and manufacturing method of LPG used as a mode coupler, an optical filter, etc.

In addition, this invention relates to the gain equalizer to flatten the gain characteristics of an optical amplifier such as EDFA (Erbium-doped Fiber Amplifier). Moreover, the present invention relates to such LPG, which flattens the gain profile of EDFA and controls the slope of the gain profile of said EDFA and the controlling method.

BACKGROUND OF THE INVENTION

LPG is a long periodic change of the refractive index formed in the direction of a fiber axis by irradiating the UV laser to the core of the single mode optical fiber after optical fiber is stripped of the outer resin coating. In this LPG, a period very much longer than the wavelength of the transmitted wavelength-multiplexing optical signal is formed, for example, a period of between 100 µm and several 100 µm.

In accordance with the long period characteristics of this LPG, the coupling of the specific set of different propagation modes is made possible by the propagation of the optical signal through this grating, thus enabling the LPG to be used as a mode coupler. Moreover, LPG has the optical transmission characteristics of plural optical transmission loss peaks at different wavelengths corresponding to the fundamental mode to the $N^{th}$ mode (N is two or more integers).

As shown in FIG. 1-7, this optical transmission characteristics is generated by the coupling of the fundamental mode through the LPG 72 having a period A formed in the core 71 of the single mode optical fiber 70 with the cladding mode through the cladding layer 73.

Therefore, the power of the optical signals of the propagation modes of the optical fiber can be coupled to the cladding modes of the optical signal 74. As a result of this, most of the power coupled with the cladding mode of the optical signal 74 is lost. Then the LPG can also be used as a non-reflection filter having a peak wavelength of an optical transmission loss.

LPG, as a non-reflection filter mentioned above, is used for gain equalizer of an optical amplifier, such as EDFA, as disclosed in a Japanese Patent Publication No. 2001-124941, for example.

The erbium doped optical fiber (EDF) used in the EDFA is made up of silica doped with germanium oxide ($GeO_2$), which is the refractive index influencing material, in the same way as in a single mode optical fiber and in addition is also doped with erbium oxide ($Er_2O_3:Er^{3+}$). A discrete energy level of $Er^{3+}$ is used for optical amplification. When energy is given to the EDF from the external source, the resultant excited electron is brought back to the ground state by emitting a light energy of different wavelength, and as a result, the incident light is amplified, similar to the Laser mechanism. Since the gain band of the EDFA is comparatively wide, the EDFA can amplify two or more signal light within a wavelength band, and hence is used in the repeaters for the WDM transmission system.

The fiber grating component comprises a single mode optical fiber (SMF) and a fiber grating, which is a periodic change of the refractive index formed in the direction of the fiber axis of this SMF by irradiation of UV laser light to the core layer.

A fiber grating wherein the periodic change of the refractive index is of the order same as the wavelength of the optical signal transmitting through the grating region, for example, of the order of 1 µm, is called short period grating or fiber Bragg grating (FBG).

On the other hand, a fiber grating with a periodic change of within 100 µm to several 100 µm is called a long-period grating (LPG). LPG can couple the propagation mode of the optical fiber with the cladding mode. Due to such characteristics, the LPG components are used in several kinds of optical communication systems, for example, in WDM (Wavelength Divisional Multiplexing) systems as a filter device to control or remove the Amplified Spontaneous Emission (ASE) of the optical amplifier such as EDFA or to compensate the gain-wavelength dependency.

In conventional LPG72, the surface of the cladding layer 73, which is stripped off the coating, is exposed to outside environment as shown in FIG. 1-7. Therefore, the outside environment influences the optical signal 74 of a cladding mode, which propagates through the cladding layer 73.

For instance, the wavelength characteristics of the cladding mode under various outside environments having different refractive indices are shown in FIG. 1-8.

As shown in FIG. 1-8, in LPG 52 designed to have the peak wavelength of optical transmission loss of about 1580 nm, for instance, the wavelength dependence characteristics of optical transmission loss differ sharply in accordance with the difference of the refractive index of outside environment (refractive index n=1, n=1.47, n=1.50). As a result, it was difficult to obtain the desired filtering characteristics.

As shown in FIG. 1-8, the wavelength dependence characteristics of optical transmission loss can be maintained when the refractive index of outside environment is n=1, that is, the outside environment of LPG 52 grating region is air.

Thus, in the conventional LPG, the grating region is uncovered, surrounded by air, and the LPG is adhered in the groove of the glass package.

The grating region protected by such a glass package is further protected by a protection part such as SUS pipe, etc., (second package) and is made as a LPG component.

FIG. 1-9 shows a protection structure of the conventional glass package for the grating region.

As shown in FIG. 1-9, the glass package 60 has the groove 61 of cylindrical form. The optical fiber 63 with the grating region is arranged in the groove 61 of the glass package 60 and is surrounded by air 62. In addition, both the ends of the glass package 60 and of the optical fiber 63 are fixed with adhesive 64.

In making a conventional LPG component, the glass package for protecting the grating region and the adhesive that connects the glass package with the optical fiber are always needed. This raises the cost of the final LPG component.

Moreover, the conventional LPG has a possibility that the wavelength dependence characteristics of the transmission loss might change with the degradation of the adhesives with the passage of time.

Furthermore, in manufacturing the LPG components, the protection process mentioned above by which the grating region is protected by the glass package, the adhesion process using adhesives, an adhesive annealing process and the secondary package processes are needed. Therefore, the number of manufacturing processes increased and the manufacturing cost rose.

In addition, as shown in FIG. 2-8, the center wavelength of LPG component which uses SMF has a big temperature dependency (about 50 pm/° C.) compared with an usual gain equalizer. Since, methods to compensate the above-mentioned temperature dependency of the center wavelength is additionally required when LPG component that used SMF is employed, the use of LPG component as gain equalizer is rare.

Furthermore, in order to use LPG for various optical fiber communications systems, such as a WDM system, the variation of the center wavelength has to be suppressed to about 0.5 nm or less, and the variation of transmission loss has to be controlled to about 1 dB or less, for a design permissible value, for example, from a viewpoint of securing the long-term reliability.

As a result of performing the long-term reliability examination to LPG using SMF based on GR-1221 of Bellcore (Telcordia), as shown in FIG. 2-9, it turns out that center wavelength shifts to about 3 nm to the short wavelength side, and the transmission loss profile is changed.

Therefore, it is needed to increase the long-term reliability of LPG component, i.e., the shift of center wavelength has to be suppressed sharply and the transmission loss profile has to be matched after the long-term reliability examination based GR-1221 of Bellcore(Telcordia).

Moreover, recently, Dynamic Gain Equalizer (D-GEQ) has been developed as a gain equalizer to compensate the variation of gain profile of EDFA with the temperature change or passage of time (dynamic waveform change). This D-GEQ has the transmission loss wavelength characteristics which shows dynamic temperature dependency making it possible to compensate said dynamic change in the profile.

That is, since the temperature coefficient of LPG is the product of the difference of the temperature dependency of the effective refractive index of the core layer and the cladding layer and the period of grating, it becomes large compared with usual gain equalizer, such as the dielectric multi layer filter.

Therefore, the temperature dependency of the transmission loss of LPG proportional to the above-mentioned temperature coefficient also changes greatly compared with a usual gain equalizer.

The use of LPG as D-GEQ to compensate the variation of the gain profile of EDFA with the temperature change or passage of time is currently being researched. This LPG has the temperature dependency of the transmission loss based on the above-mentioned temperature coefficient.

However, the temperature dependency of the center wavelength of LPG which uses the SMF having a core layer doped with GeO2 is about 0.05 nm/° C. as shown in FIG. 3-6. FIG. 3-5 is the refractive index profile of above-mentioned SMF.

The temperature dependency of the center wavelength of about 0.05 nm/° C. of the above-mentioned LPG is insufficient to compensate for the variation of the gain profile of EDFA with the temperature change or passage of time. Therefore, it is necessary to increase the temperature dependency of the center wavelength of LPG.

Moreover, when the difference of power level of the optical signals, which have different wavelength is large, the transmission distance and the transmission band might be decreased due to deteriorated the optical signal in the WDM transmission system. Therefore, it is demanded that an optical amplifier make the gain characteristic of the transmission band flat.

However, the gain characteristic of the transmission band of EDFA (for instance, 1530 nm-1610 nm) has the wavelength dependency. Moreover, the noise caused by ASE which is included in the incident light occurs.

Therefore, it is important that the gain equalizer compensates for the wavelength dependency of the gain profile. In addition, it is important that the gain equalizer suppresses ASE, too. The EDFA is combined with a filter device having a transmission loss profile capable of compensating the gain profile of EDFA, so that the practice of flattening the gain profile of EDFA is used. In particular, as for this filter device, LPG having a period from 100 µm to 500 µm is used.

However, the following two problems exist when the above-mentioned LPG is applied to EDFA.

As for the first problem, the gain profile of EDFA varies by the change of temperature. The change in the metastable energy level of the erbium ions changes the gain profile of EDFA. Because of this, the change of temperature varies the slope of the gain profile. In the above-mentioned gain equalizing method, compensation of the change in the slope of the gain profile with the variation in temperature is not carried out.

Therefore, the adjustment of the temperature of the entire EDFA is necessary, generally. However, when such total temperature adjustment is done, the EDFA can not be miniaturized and also the consumption of electricity becomes very high.

As for the other problem, when power of an input signal fluctuates, this disturbance causes the fluctuation in the state of population inversion in EDFA and thus the gain profile of the EDFA varies. Therefore, when a transmission loss profile of a filter device, which is connected to the EDFA, is fixed, the filter device cannot compensate for the variation in the gain profile of EDFA. As a result, the flatness of the gain profile of an amplified output signal deteriorates.

A dynamic gain equalizer, which can vary the transmission loss profile of filter device in the opposite direction so that the variation in the gain profile of EDFA is cancelled out, is reported.

For example, a dynamic gain equalizer is formed by coating the surface of LPG with a material having large temperature coefficient of refractive index. When the temperature of this coating material is changed by means of heaters, different transmission loss profile can be obtained. In other words dynamic gain equalizer forms a transmission loss profile that seems to cancel it as against a gain profile of EDFA. As a result, flatness of a gain profile of EDFA is improved.

The above-mentioned technique is to improve the flatness of the gain profile by combining the EDFA with a filter device having a transmission loss profile which is opposite in characteristic to the gain profile of EDFA. Though the above-mentioned dynamic gain equalizer can suppress the variation in the gain profile of EDFA, it can not control the slope of the gain profile.

The final slope of the gain profile of EDFA in combination with the dynamic gain equalizer can not be controlled even though the fluctuation in the absolute value of the gain can be suppressed by the dynamic gain equalizer. Therefore, there is a limitation to the flatness of the gain profile finally obtained by using this dynamic gain equalizer.

Moreover, as mentioned above, when the slope of the gain profile is varied by the temperature change of EDFA, it cannot compensate for the variation in the slope by a conventional method of the gain equalization. Then, it is necessary to maintain the temperature of the entire EDFA, thus making the EDFA larger and increasing the power consumption.

SUMMARY OF THE INVENTION

In view of the above-described problems of the conventional art, an object of the present invention is to provide an optical fiber for LPG, a LPG components, manufacturing method of LPG and a variable loss equalizer.

To achieve the above object, there is provided an optical fiber for LPG comprising: a core layer, a first (1st) cladding layer that surrounds said core layer and transmits the cladding modes, and a second (2nd) cladding layer that surrounds said first (1st) cladding layer and confines the optical signal of the cladding mode within said first (1st) cladding layer.

Further, in the present invention, there is provided a LPG component comprising: an optical fiber for LPG, consisting a core layer wherein LPG is constructed, a first (1st) cladding layer that surrounds said core layer and transmits the cladding modes, and a 2nd cladding layer that surrounds said first (1st) cladding layer and confines the optical signal of the cladding mode within said first (1st) cladding layer, and a coating reinforcement to cover and reinforce said optical fiber for LPG.

Further, in the present invention, there is provided an optical fiber for LPG comprising: a core layer which is doped with a 1st material having a positive temperature co-efficient of refractive index and sensitive to exposure of ultraviolet light, and a cladding layer, which is having a refractive index lower than that of said core layer and which is doped with a 2nd material having a negative temperature co-efficient, surrounding said core layer.

Further, in the present invention, there is provided a manufacturing method of LPG component comprising: a step of preparation of an optical fiber consists, a core layer, a first (1st) cladding layer that surrounds said core layer and transmits the cladding modes, and a 2nd cladding layer that surrounds said first (1st) cladding layer and confines the optical signal of the cladding mode within said first (1st) cladding layer, a step of constructing the LPG on a predetermined region in said core of said optical fiber by irradiating laser light on said region over a predetermined period corresponding to the LPG, on the predetermined part of said optical fiber, and a step which covers and reinforces said grating region.

Further, in the present invention, there is provided, a LPG component is characterized by controlling the slope of the gain profile arbitrarily by changing the slope of the transmission loss profile corresponding to the slope of the gain profile of EDFA (Erbium-doped Fiber Amplifier).

Further, in the present invention, there is provided a variable loss equalizer comprising: a cascade connection of plural number of LPGs which are coated by a material having high temperature dependency of refractive index, the temperature variation of which aiding to the flattening of the slope of the transmission loss profile in the predetermined wavelength band.

BRIEF DESCRIPTION OF THE DRAWINGS

FIG. 1-2 is the cross section, along the line II-II, of the LPG component shown in FIG. 1-1.

FIG. 1-3 is figure wherein the dimensions of the optical fiber for LPG 2 and the refractive index profile are outlined.

FIG. 1-4 is figure wherein the inside of the optical fiber for LPG is outlined.

FIG. 1-5 is a result of comparing the wavelength dependence characteristics of the optical loss in the optical fiber for LPG 2 of this invention (which is surrounded by a material of refractive index n=1.47) with that of the optical fiber for LPG without the $2^{nd}$ cladding layer and surrounded by air of refractive index n=1.

FIG. 1-6($a$) is a figure wherein the manufacturing process of LPG component of this invention is shown, and FIG. 1-6($b$) is figure wherein the manufacturing process of conventional LPG component is shown.

FIG. 1-7 is a figure wherein composition of the optical fiber for conventional LPG and the cladding mode propagation in the cladding layer is outlined.

FIG. 1-8 is figure wherein the variation in the transmission loss profile of the conventional LPG with the difference of the refractive index of the external environment is shown.

FIG. 1-9 is figure wherein the protection, package (structure) of a conventional LPG is shown.

FIG. 2-1 is a perspective figure that shows optical fiber for LPG after metalized of this invention.

FIG. 2-2 is a cross sectional view along direction of the diameter of the optical fiber for LPG shown in FIG. 2-1.

FIG. 2-3 is figure wherein the dimensions and the refractive index profile of the optical fiber 22 shown in FIG. 2-1 are outlined.

FIG. 2-4 is figure wherein the result of actually measuring the temperature dependency of the center wavelength of LPG component of this invention is shown.

FIG. 2-5 shows the transmission loss profile of the fiber grating components, before and after the direct hermetic coating of the metallic layer to the SMF having one cladding layer, respectively. The short dashed line shows before the metallic coating, and the solid line shows after metallic coating.

FIG. 2-6 shows the result of actually measuring the transmission loss profile of LPG component of this invention. The short dashed line shows before metallic coating, and the solid line shows after metallic coating.

FIG. 2-7 shows the result of long-term reliability test of LPG component of this invention in accordance with GR-1221 of Bellcore(Telcordia).

FIG. 2-8 shows the temperature dependency of the center wavelength of LPG that uses SMF.

FIG. 2-9 is figure wherein the result of long-term reliability test of LPG that uses SMF in accordance with GR-1221 of Bellcore(Telcordia) is shown.

FIG. 3-1 is a perspective figure that shows optical fiber for LPG 32 of this invention.

FIG. 3-2 is figure wherein the dimensions and the refractive index profile of the optical fiber for LPG 32 shown in FIG. 3-1 are outlined.

FIG. 3-3 shows the result of actually measuring the amount of the shift of the center wavelength of LPG 310 in LPG component shown in FIG. 3-1, based on the temperature change.

FIG. 3-4 is figure wherein the temperature dependency of the transmission loss profile of LPG 310 in LPG component shown in FIG. 3-1 is given.

FIG. 3-5 is figure that shows the refractive index profile of SMF.

FIG. 3-6 shows the temperature dependency of the center wavelength of LPG which uses SMF.

FIG. 4-1 is an outline figure wherein the structure of LPG of this invention is shown.

FIG. 4-2 is a figure wherein the refractive index profile of the LPG of this invention along the radial direction is shown.

FIG. 4-3 is a figure wherein transmission loss profile with a positive slope in the active wavelength band in LPG of this invention is shown.

FIG. 4-4 is a figure wherein transmission loss profile with a negative slope in the active wavelength band in LPG of this invention is shown.

FIG. 4-5 is a figure wherein the change in gain profile by the temperature change of EDFA is shown.

FIG. 4-6 is a figure wherein the change in gain profile by the temperature change when LPG of this invention is combined with EDFA is shown.

FIG. 4-7 is a figure wherein the temperature dependency of the center wavelength of conventional LPG is shown.

FIG. 4-8 is a figure wherein the temperature dependency of the center wavelength of LPG of this invention wherein $GeO_2/B_2O_3$ are co-doped to the core layer is shown.

FIG. 4-9 is a figure wherein the long-term reliability test result of conventional LPG is shown.

FIG. 4-10 is a figure wherein the long-term reliability test result of LPG coated hermetically is shown.

FIG. 4-11 is a figure wherein the composition of a variable loss equalizer using LPG of this invention is shown.

In FIG. 4-12 the transmission loss profile of the LPGs which compose the variable loss equalizer of FIG. 4-11 and the transmission loss profile of this variable loss equalizer, is shown.

DETAILED DESCRIPTION

Hereafter, the detailed explanation of the preferred embodiments of the present invention is given with reference to the figures.

The purpose of the present invention is to maintain to a greater extent the wavelength dependence characteristics of the optical transmission loss of the LPG component and to improve the reliability of the LPG component, not being influenced by the external environment of Grating region, and to decrease the manufacturing time and cost.

The other purpose of the present invention is to offer an LPG component in which the temperature dependency of the center wavelength is greatly suppressed. In addition, another purpose is greatly improving the long-term reliability of the LPG component.

In addition, the other purpose of the present invention is to offer an optical fiber for LPG, and a LPG component using the optical fiber for LPG, which can compensate for the effect of the variation of the temperature and the period of usage on the gain characteristics of the optical fiber amplifier such as EDFA. Yet another purpose of the present invention is to offer a LPG component to obtain flat gain profile of EDFA, which can fulfill the demand of the WDM transmission in the future.

Figure 1:
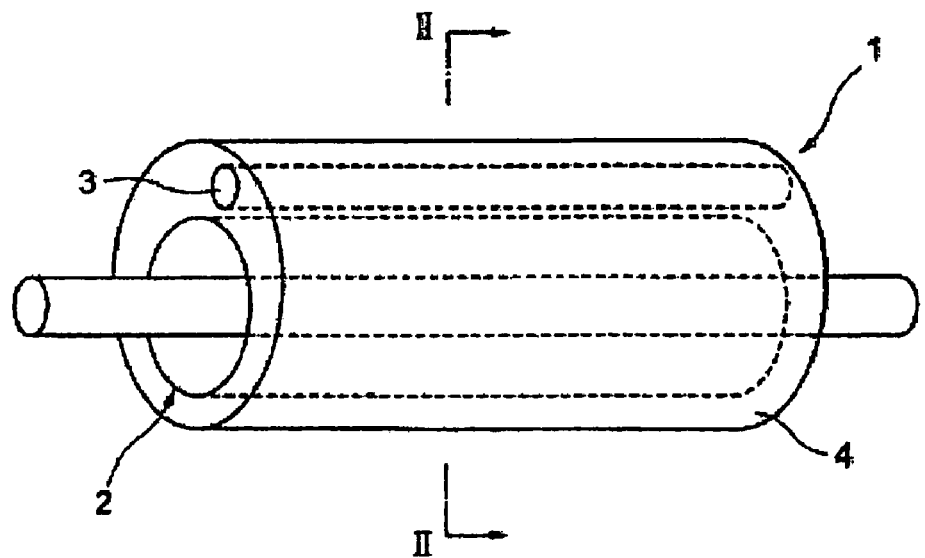
FIG. 1-1 is a perspective figure that shows the outline of the composition of a LPG component wherein the optical fiber for LPG of the present invention is packaged.

FIG. 1-1 is a perspective figure that shows the outline of the composition of a LPG component wherein the optical fiber for LPG of the present invention is packaged.

LPG component 1 consists an optical fiber for LPG 2 in which the LPG is formed and a metallic rod such as SUS304 arranged parallel to the optical fiber 2, which reinforces the optical fiber 2.

Also, the LPG component has a reinforcement sleeve 4 made up of heat contractible materials, which surrounds the optical fiber for LPG 2 and the metallic rod 3, upon heating. For instance, this reinforcement sleeve 4 is manufactured from EVA (Ethylene Vinyl Acetate copolymer), etc.

Figures 1, 2:
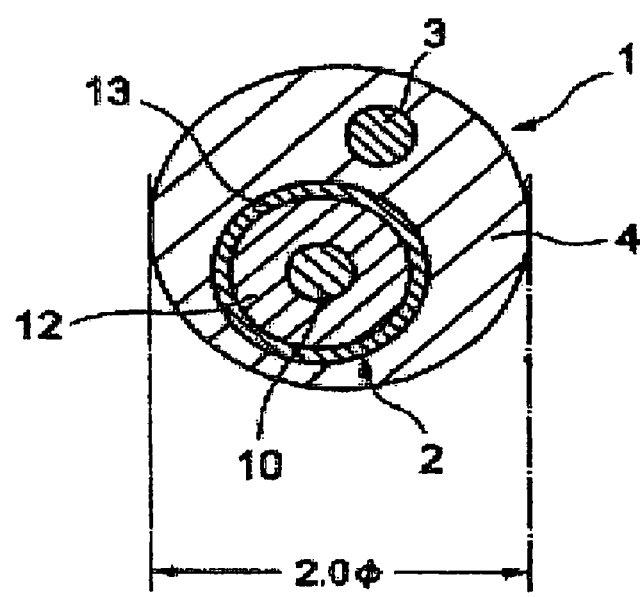
Figures 1, 2, 3:
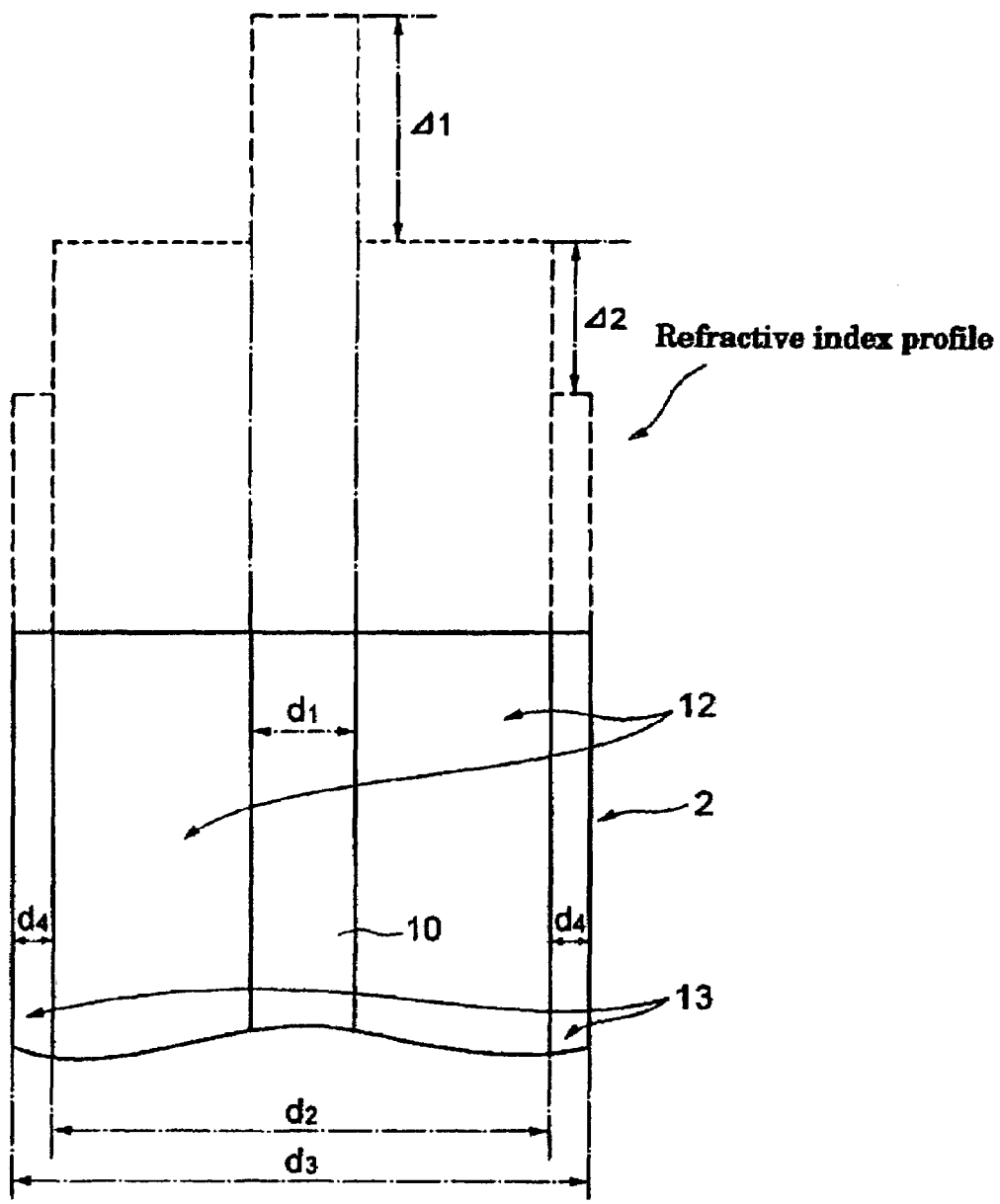

FIG. 1-2 is the cross section, along the line II-II, of the LPG component 1 shown in FIG. 1-1, and in FIG. 1-3, the dimension of the optical fiber for LPG 2 and the refractive index profile (shown in the short dashed line) are outlined.

The optical fiber for LPG 2 has a core layer 10 made up of silica doped with $GeO_2$, as shown in FIG. 1-2 and FIG. 1-3. LPG11 (period of about 440 μm and grating length of about 22 mm) is formed in this core layer 10, as shown in FIG. 1-4, which changed the refractive index of the optical fiber periodically along the longitudinal direction of the fiber.

The optical fiber for LPG 2 further comprises a 1st cladding layer12 which surrounds the core layer 10 and transmits the cladding modes and a 2nd cladding layer 13 which surrounds the 1st cladding layer12 and confines the cladding modes spread through the 1st cladding layer 12, by the function of LPG11, within the 1st cladding layer.

The core layer 10 has the core diameter $d_1$ of about 10 μm, and refractive index of about 1.467, and the 1st cladding layer12 has a cladding diameter $d_2$ of about 119 μm, for example. In order to transmit the propagation mode through the core layer 10, the material whose refractive index is a little smaller than the refractive index of the core layer 10 is used as the material of 1st cladding layer 12.

For instance, $SiO_2$ of refractive index about 1.458 is used as a material of 1st cladding layer12 in this embodiment.

The 2nd cladding layer13 has a cladding diameter $d_3$ of about 125 μm. Fluorine (F) or Boron ($B_2O_3$), etc. doped silica, which has a refractive index a little smaller than the refractive index of 1st cladding layer12, has been used as the material of 2nd cladding layer.

The optical fiber for LPG 2 is a so-called step index type optical fiber having the profile as shown in the short dashed line in FIG. 1-3, wherein the respective refractive indices of the core layer 10, 1st cladding layer 12, and the 2nd cladding layer 13 change in steps.

For instance, to suppress the dispersion of the pulse in the wavelength band used, difference of refractive index $\Delta 1$ of core layer 10 and 1st cladding layer12 is set to about 0.35%.

Moreover, to confine the optical signal of the cladding mode with in the 1st cladding layer12, the difference of the refractive index $\Delta 2$ of the 1st cladding layer12 and the 2nd cladding layer13 is set to about 0.5% for instance.

The 2nd cladding layer13 has been arranged in the shape of concentric circle to the 1st cladding layer and surrounds the 1st cladding layer12, shown in FIG. 1-3. The thickness $d_4$, of 2nd cladding layer13 is set to a thickness necessary to maintain the propagation characteristics of the cladding modes of the optical signal. For instance, when cladding diameter $d_2$ of 1st cladding layer12 is set as 119 μm and cladding diameter $d_3$ of 2nd cladding layer13 as 125 μm, then the thickness $d_4$ of 2nd cladding layer13 is set to more than 2 μm, preferably about 3 μm.

Next, the action of the optical fiber for LPG 2 concerning this embodiment is explained.

The propagation mode of the optical signals, which has a specific wavelength band, radiated from the core layer 10 to 1st cladding layer 12, can be coupled with the cladding modes S1, S2 propagated in the 1st cladding layer 12 by LPG 11 formed in the core layer 10 of optical fiber for LPG 2, as shown in FIG. 1-4. Consequently, transmission loss of optical signals increased in a predetermined wavelength band when the optical signals are coupled with the cladding modes S1 and S2.

In this embodiment, the circumference of the 1st cladding layer 12 is surrounded by the 2nd cladding layer 13, which has smaller refractive index than the refractive index of the 1st cladding layer 12.

Therefore, the cladding modes S1 and S2 of the optical signal are reflected totally at the boundary of 2nd cladding layer 13 and hence are propagated within the 1st cladding layer 12, as shown in FIG. 1-4.

Consequently, cladding modes S1, S2 of the optical signal propagated in 1st cladding layer 12 can be confined within the 1st cladding layer 12 regardless of the outside environment of 2nd cladding layer 13.

FIG. 1-5 is a result of comparing the wavelength dependence characteristics of the optical loss in the optical fiber for LPG 2 of this embodiment (which is surrounded by a material of refractive index n=1.47) with that of the optical fiber for LPG without the 2nd cladding layer and surrounded by air of refractive index n=1.

The optical fiber for LPG 2 of this embodiment, which is not surrounded by air, can obtain almost the same wavelength dependence characteristics of optical loss of an optical fiber for LPG surrounded by air, as clearly seen from FIG. 1-5.

The optical fiber for LPG having the grating region can be reinforced by sticking the reinforcement sleeve 4 to the surroundings of the optical fiber for LPG 2, as shown in FIG. 1-1 and FIG. 1-2.

As a result, optical fiber for LPG 2 can be packaged with the reinforcement sleeve 4 without using the glass package and the adhesive and thus the cost of the LPG component 1 can be decreased.

In addition, since the grating region can be reinforced by the reinforcement sleeve 4 without using the adhesive, the influence of the degradation of the adhesives and the passage of time on the wavelength dependence characteristics of the transmission loss is avoided and consequently long time reliability of the LPG component 1 can be achieved.

Next, the manufacturing process of LPG component 1 of this embodiment is explained with reference to FIG. 1-6(*a*) and FIG. 1-6(*b*).

As shown in FIG. 1-6(A), first, the optical fiber for LPG 2 concerning this embodiment is prepared, and subsequently hydrogen processing is performed to this optical fiber at a high pressure of, for example, 15 Mpa for about three weeks and the photosensitivity of the optical fiber 2 is raised to a level to be used in practice (step S1). Next, the optical fiber for LPG 2 is stripped of the outer resin coating (step S2).

Next, the ultraviolet rays of the Argon laser are irradiated on the optical fiber 2, over a period corresponding to a predetermined grating shape (period of about 440 μm and grating length of about 22 mm). By this laser light irradiation, LPG 11 having the above grating shape is formed in the optical fiber 2 (step S3).

Then the optical fiber 2 having LPG 11, has been annealed at, for example, 80° C.-120° C. and hydrogen is removed from it (step S4). Subsequently, after the process of removal of hydrogen, the stabilized grating shape and characteristics are obtained by partial heating (stabilization annealing process), based on the degradation of said grating shape and characteristics with the passage of time.

In this embodiment, it is not necessary that the optical fiber 2, in which LPG 11 is formed, be surrounded by air. Then, instead of the conventional glass package, the reinforcement sleeve 4 having a length longer than the length of the grating region of LPG 11 along the direction of the fiber axis, a cross-sectional area larger than that of the optical fiber 2, and made up of materials (EVA) which have heat contractible characteristics, is prepared.

The optical fiber having LPG 11 is packaged by heating the reinforcement sleeve 4 at 150° C.-160° C. for 20-30 sec and sticking it to the optical fiber having LPG 11 (step S6).

The LPG component 1 is manufactured by the above-mentioned processes.

The various optical characteristics of the LPG component 1 manufactured by the process from step S1 to step S6 are inspected, and only components that have an excellent result are selected as LPG component 1 (step S7).

The manufacturing process (step S1-S5, S10-S12, and S7) of a conventional LPG component is shown in FIG. 1-6(*b*).

In the manufacturing process (step S1-step S7) of LPG component 1 in this embodiment shown in FIG. 1-6(*a*), the process of the package of optical fiber 2 after the formation of LPG 11 is only one process, namely the reinforcement process of fixing the reinforcement sleeve 4 to the optical fiber 2, as evident clearly from FIG. 1-6(*a*) and FIG. 1-6(*b*).

On the other hand, the following processes are needed in the manufacturing process (step S1-S5, S10-S12, and S7) of conventional LPG component, as shown in FIG. 1-6(*b*): glass package adhesion process (step S10) of adhering the optical fiber having the grating region with the glass package using adhesives, adhesive annealing process (step S11), process of secondary package to protect the glass package, in metal pipe made of SUS, for instance (step S12).

Therefore, according to the manufacturing processes of LPG component 1 of this embodiment, the number of manufacturing processes can be greatly decreased, the manufacturing time can be shortened greatly, and the manufacturing cost can be decreased.

Moreover, the reinforcement sleeve 4 which is made up of the material which has heat contractibility sticks to the grating region in the LPG component 1 manufactured based on the process in FIG. 1-6(*a*). Therefore, the optical fiber 2 having LPG 11 need not be surrounded by air and hence, the size of the entire component can be made compact.

For instance, since air layer and glass package are necessary, in the conventional LPG component shown in FIG. 1-9, the diameter of the entire component is about 3.5 φmm.

However, the diameter of the entire component is about 2.0 φmm in the case of the LPG component 1 of this embodiment, as shown in FIG. 1-2, and thus miniaturization is greatly possible.

Though in this embodiment, the 1st cladding layer 12 is assumed to be an undoped silica layer and the 2nd cladding layer 13 is assumed to be fluorine doped silica layer, the present invention is not limited to only this.

For example, cladding layer can be formed with other materials which have the refractive index values suitable to make the refractive index of the 1st cladding layer a little smaller than that of the core layer, and the refractive index of the 2nd cladding layer a little smaller than that of 1st cladding layer.

Moreover, though the tubular reinforcement made up of heat contractible material is used to cover and reinforce said grating region of the optical fiber for LPG in this embodiment, the present invention is not limited only to this.

For instance, it is also possible to use other coating reinforcement materials, which have the advantage that the air layer and glass package are unnecessary.

FIG. 2-1 is a perspective figure that shows a LPG component21 of the present invention.

LPG component21 has optical fiber for LPG 22 instead of the standard SMF as shown in FIG. 2-1.

The optical fiber for LPG 22 has a core layer 23 which is made up of silica co-doped with $GeO_2$ and $B_2O_3$ having higher refractive index than the refractive index of fused silica ($SiO_2$) and has ultraviolet rays photosensitivity, as shown in FIG. 2-1.

Moreover, the optical fiber 22 has the 1st cladding layer 24 which surrounds core layer 23, and 2nd cladding layer 25 which surrounds 1st cladding layer24. 1st cladding layer24 is formed with $SiO_2$, which has a lower refractive index than that of the core layer 23. 2nd cladding layer25 is formed by the doping of fluorine (F) in $SiO_2$, which has a lower refractive index than that of the $SiO_2$.

Table 1 shows the temperature co-efficient of the refractive index of $SiO_2$, a material which constituted the core layer 23, and that of $GeO_2$ and $B_2O_3$, which are co-doped into said $SiO_2$.

TABLE 1

| Material | (Temperature co-efficient of refractive index) (/° C.) |
|---|---|
| $SiO_2$ | $+1.3 \times 10^{-5}$ |
| $GeO_2$ | $+1.9 \times 10^{-5}$ |
| $B_2O_3$ | $-1.9 \times 10^{-5}$ |

The refractive index of $GeO_2$ doped to core layer 23 has a positive temperature co-efficient and the refractive index of $B_2O_3$ which is co-doped with said $GeO_2$ in this core layer 23 has a negative temperature co-efficient which cancels out said positive co-efficient of $GeO_2$.

LPG component 21 has LPG 210 formed in the predetermined part of the core layer 23 along the direction of the fiber axis.

For instance, this LPG 210 has the periodic change of high and low refractive index at periods of 100 μm to several 100 μm along the axis of the fiber.

LPG 210 is formed, for instance, as follows.

First of all, hydrogen is loaded to the optical fiber 22 which consists of said core layer 23, the 1st cladding layer24, and the 2nd cladding layer25, by the high pressure.

After loading hydrogen to the optical fiber 22, ultraviolet rays is irradiated to optical fiber 22 periodically. As a result, LPG 210 is formed in the predetermined part of the core layer 23 of the optical fiber 22 along the direction of the fiber axis.

In addition, LPG component 21 has a double metallic layer 211 coated hermetically by using two different metals so that neither air nor humidity can pass through the surrounding part of the 2nd cladding layer 25 of optical fiber 22 with which LPG 210 is formed.

FIG. 2-2 is a cross sectional view along the direction of the diameter of LPG component 21. Optical fiber 22 is shown as one section, and the thickness of the metallic layer 211 has been expanded in FIG. 2-2.

Metallic layer 211 is a two-layer structure as shown in FIG. 2-2. An inside layer is the titanium layer 211a, and titanium which is the 1st metallic material is coated outside of the 2nd cladding layer 25. Heating the optical fiber 22, to which titanium is coated, for instance, for 12 minutes at the temperature of 100-150° C., forms this titanium layer 211a.

An outside layer is nickel (Ni) layer 211b, and nickel which is the 2nd metallic material is coated outside of the titanium layer 211a. This nickel layer 211b is formed by heating the optical fiber 22 to which nickel is coated, for instance, for 75 minutes at the temperature of 100° C. or less.

Though the metallic layer 211 is formed in the order of titanium layer 211a followed by the nickel layer 211b, it is not limited by this order of formation of the metallic layers. Either of the layers can be formed over the 2nd cladding layer 22 followed by the other one.

Moreover, though metallic materials of titanium and the nickel are used in the formation of the metallic layer 211, this does not limit it, and it is possible to use other materials to form the hermetic structure.

In FIG. 2-3 herein the dimensions of the optical fiber 22 and the refractive index profile (dashed lines) are outlined.

Core layer 23 has mode field diameter $d_{21}$ (light intensity distribution in the fiber) of about 10 μm. Moreover, 1st cladding layer 24 has cladding diameter $d_{22}$ (diameter of 1st cladding layer 24 including core layer 23) of about 119 μm.

Moreover, the refractive index of the core layer 23 and the 1st cladding layer 24 changed in steps. To enlarge the mode field diameter of core layer 23, and thereby to suppress the dispersion in the operating band of the incidence optical signals, the difference of refractive index $\Delta 1$ of core layer 23 and 1st cladding layer 24 is set to about 0.35%, for example.

And, the following two parameters are set to confine the cladding mode of the optical signal within the 1st cladding layer. (i)Thickness $d_4$ of the 2nd cladding layer 25. (ii) Difference of refractive index $\Delta 2$ of 2nd cladding layer 25 and 1st cladding layer 24.

For instance, thickness $d_4$ of the layer of 2nd cladding layer 25 is set to about 3~4 μm, diameter of 2nd cladding layer 25 including core layer 23 and 1st cladding layer 24 is set to about 125 μm, and the difference of the refractive index $\Delta 2$ of 2nd cladding layer 25 and 1st cladding layer 24 is set to about 0.5%±0.05%.

Said differences of refractive index $\Delta 1$ and $\Delta 2$ are set depending on the amount of the doping materials that are doped in the core layer 23, 1st cladding layer24, and 2nd cladding layer 25 respectively.

Moreover, thickness $d_6$ of the titanium layer 211a is set to about 0.05 μm, the thickness $d_7$ of the nickel layer 211b is set to about 0.09 μm and the thickness $d_5$ of the whole metallic layer 211 is set to about 0.14 μm, for instance.

Next, the function of the LPG component 21 in this embodiment is explained hereafter.

First of all, it explains the filter action of LPG component 21.

The propagation mode of the optical signals, which has a specific wavelength band, radiated from the core layer 23 to 1st cladding layer 24 can be coupled with the cladding modes S21, S22 propagated in the 1st cladding layer 24 by LPG 210 formed in the core layer 23 of optical fiber for LPG 22, as shown in FIG. 2-1. Consequently, transmission loss of optical signals increased in a predetermined wavelength band when the optical signals are coupled with the cladding modes S21 and S22.

Therefore, LPG component 21 having LPG 210, functions as an isolation filter which has the desired wavelength isolation band (wavelength transmission loss band).

Next, the specific function of this embodiment is explained hereafter.

The center wavelength of LPG, which uses SMF, has large temperature co-efficient (about 50 pm/° C.), as shown in FIG. 2-8. The reason for this is that the refractive index of $GeO_2$, doped to the core layer of SMF, has a positive temperature co-efficient, as shown in Table 1.

However, $B_2O_3$ with a negative temperature co-efficient, which cancels out the positive temperature co-efficient of $GeO_2$ has been co-doped along with $GeO_2$ in the core layer 23 of LPG component 21 of this embodiment. Therefore, the temperature co-efficient of the refractive index can be counterbalanced, and the temperature co-efficient of the center wavelength of LPG component 21, which originates due to the said temperature co-efficient of refractive index, can be greatly controlled.

Figures 1, 2, 3, 4:
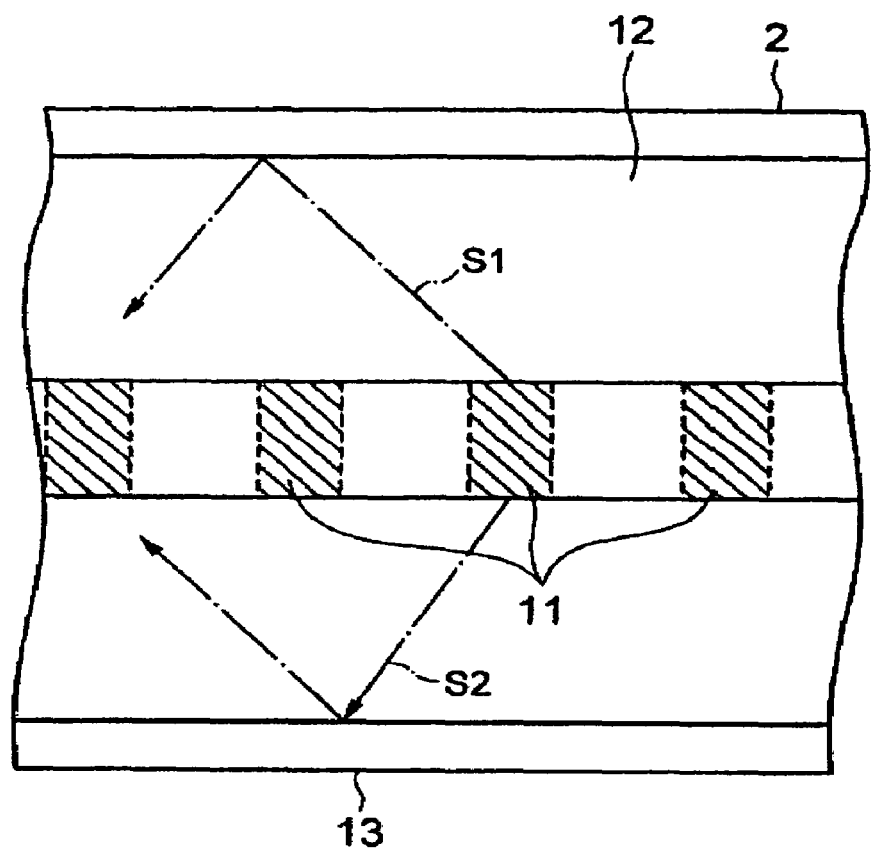

FIG. 2-4 is a result of actually measuring the temperature co-efficient of the center wavelength of LPG component 21 in this embodiment. The temperature co-efficient of the center wavelength is controlled greatly with about 0.2 nm in the maximum within the temperature range of −20° C. to 65° C.

On the other hand, results of the long-term reliability examination (high temperature high humidity examination) of the LPG using SMF, based on GR-1221 of Bellcore (Telcordia), showed the generation of the shift of the center wavelength and the change of the transmission loss profile, as shown in FIG. 2-9.

The reason for a shift of this center wavelength and the change of the transmission loss profile is that the outside environment element (especially, humidity) in the surroundings of SMF infiltrate in to SMF, and the characteristic of LPG is changed.

However, optical fiber 22 in the present embodiment can completely prevent the optical fiber from coming in to contact with air and humidity since the circumference of LPG 210 is at least coated hermetically with metallic layer 211. As a result, the characteristic of LPG 210 is maintained to long-term.

In this embodiment especially, SMF is not coated with a hermetically coated layer directly on the 1st cladding layer. The 1st cladding layer 24 of optical fiber 22 is surrounded with 2nd cladding layer 25, and the circumference of the 2nd cladding layer is hermetically coated with the metallic layer 211.

The transmission loss profile of the fiber grating components, before and after the direct hermetic coating of the metallic layer to the SMF having one cladding layer are shown in FIG. 2-5, respectively.

The boundary condition of the cladding layer of SMF changes with this metallic layer when the metallic layer is coated directly to the circumference of the optical fiber (surrounding cladding layer is one layer). Therefore, the coupling factor between a fundamental mode and the cladding mode in LPG changes. As a result, it can be understood that the center wavelength of LPG changes greatly as shown in FIG. 2-5, and the transmission loss profile also changes.

For instance, when a gain equalizing filter of an optical amplifier is manufactured by using the LPG component with the above-mentioned SMF coated just with the metallic layer, with a design tolerance value of about 0.5 nm or less of the variation of the center wavelength and about 1 dB or less of variation of the transmission loss, the production yield decreases according to said change of center wavelength and change of transmission loss profile.

However, in the present embodiment, 1st cladding layer 24 of optical fiber 2 is surrounded with the 2nd cladding layer 25 having a refractive index lower than that of the 1st cladding layer 24. In addition, the circumference of the 2nd cladding layer 25 is hermetically coated with the metallic layer 211. Therefore, the cladding modes S21, S22 of the optical signal propagated in the 1st cladding layer is reflected totally inside at the boundary of the 2nd cladding layer 25 and confined with in the 1st cladding layer24 itself, as shown in FIG. 2-1 due to said difference of refractive index of 1st cladding layer 24 and 2nd cladding layer 25.

As a result, optical signal S21, S22 propagated in 1st cladding layer 24 does not depend on the outside environment. Moreover, said optical signal is propagated while being confined in 1st cladding layer 24.

Therefore, metallic layer 211, which surrounds the circumference of the 2nd cladding layer 25, does not influence the cladding modes S21, S22 of the optical signal propagated in the 1st cladding layer 24. Therefore, the shift of the center wavelength and the change of the transmission loss profile of LPG 210, caused by the metallic layer 211, are greatly suppressed.

FIG. 2-6 shows the result of actually measuring the transmission loss profile of the LPG component 21 in this embodiment, before and after the coating of the metallic layer, respectively. The change of the transmission loss profile of the LPG component 21 in this embodiment is greatly suppressed to about 0.2 dB by the metallic coating, as shown in FIG. 2-6.

And, the result of the long-term reliability test (high temperature and high humidity test; under high temperature and high humidity environment of 85° C.·85% RH for 2000 hours) of the LPG component 21 in this embodiment in accordance with GR-1221 of Bellcore(Telcordia) is shown in FIG. 2-7.

The center wavelengths of LPG component 21 are substantially the same before and after the test, as shown in FIG. 2-7. Moreover, the difference between the transmission loss before and after the test is about 0.1 dB.

As a result, LPG component 21 can sufficiently satisfy the design tolerance value (of about 0.5 nm or less of the change of the center wavelength and about 1 dB or less of change of the transmission loss profile), when the LPG component is used in a variety of optical communication systems such as the WDM system, etc. Moreover, the long-term reliability of the LPG component 21 and the optical communication system including the LPG component 21 can be maintained high.

Though the doping material in the core layer 23 is assumed to be $GeO_2$ and $B_2O_3$ in this embodiment, the present invention is not limited only to this. It is good in the combination of the following materials: the first material which has a positive temperature co-efficient of refractive index and refractive index value higher than that of the material in the core layer23, and the second material, which has a negative temperature co-efficient that cancels out the positive temperature co-efficient of the first material.

Moreover, though F, which has a lower refractive index than that of 1st cladding layer 24 (silica layer), is doped to the 2nd cladding layer25 in this embodiment, the present invention is not limited only to this. It is possible that, other materials such as $B_2O_3$ which have lower refractive index than that of 1st cladding layer 24(silica layer) can be doped to the 2nd cladding layer.

In addition, though titanium and nickel are used as the materials coated at the circumference of the 2nd cladding layer 25 in this embodiment, the present invention is not limited only to this. Other materials (for instance, carbon material etc.), which can hermetically protect the optical fiber 2, can be used to form metallic layer 211. Moreover, single coating layer is also acceptable.

And, though the thickness $d_4$ of the 2nd cladding layer 25 is set to about 3~4 µm, and difference of refractive index $\Delta 2$ of 1st cladding layer 24 and 2nd cladding layer 25 is set to about 0.5%±0.05% in this embodiment, this invention is not limited only to this. Any value that can confine the cladding modes of the optical signal propagated in the 1 st cladding layer within the 1st cladding layer is acceptable.

Especially, the thickness $d_4$ of the 2nd cladding layer 25 and the difference of refractive index $\Delta 2$ of the 1st cladding layer 24 and the 2nd cladding layer 25 are inversely proportional to each other. Therefore, it is preferable to set the parameters, either to make the manufacturing easy or to reduce the manufacturing cost, appropriately.

For example, if the manufacturing cost is emphasized, it is better to set the difference of the refractive index $\Delta 2$ to a higher value, for instance, about 0.7%, and to set the thickness $d_4$ of the 2nd cladding layer 25 to a smaller value, for instance, 2 µm.

Moreover, if importance is attached to easy manufacturing, it is better to set the difference of the refractive index $\Delta 2$ to a smaller value, for instance, about 0.1%, and to set the thickness $d_4$ of the 2nd cladding layer 25 to a higher value, for instance, 40 µm.

FIG. 3-1 is a perspective figure that shows LPG component 31 of this invention.

LPG component 31 has an optical fiber for LPG 32 instead of the standard SMF as shown in FIG. 3-1.

This optical fiber for LPG 32 has a core layer 33, 1st cladding layer 34 surrounding the core layer 33, and a 2nd cladding layer 35 surrounding the 1st cladding layer 34 as shown in FIG. 3-1.

The core layer 33 is formed by doping $GeO_2$, which has a higher refractive index than that of fused silica ($SiO_2$), to silica and has photosensitivity. The 1st cladding layer 34 is formed by doping $B_2O_3$ to silica. The 2nd cladding layer 35 is formed by doping F, which has lower refractive index than that of silica, to silica.

Optical fiber 32 has a mode field diameter of about 10 µm and this is larger than that of a DSF (Dispersion Shifted Fiber). Moreover, optical fiber 32 has smaller dispersion slope (wavelength co-efficient of a dispersion characteristic) than that of a DSF.

From Table 1, it can be seen that the temperature co-efficient of the refractive index of $GeO_2$ doped to the core layer 33 is positive, the temperature co-efficient of the refractive index of $B_2O_3$ doped to the 1st cladding layer 34 is negative, and the absolute value of the temperature co-efficient of the refractive index of both is the same.

Also, LPG component 31 has a grating region LPG 310 formed in the predetermined part (for instance, the length along the axial direction is about 25 mm) along the direction of the fiber axis of the core layer 33. The length (25 mm in this embodiment) along the direction of the fiber axis of said LPG 310 is defined as the length of grating part.

This LPG 310 is formed as follows. First, hydrogen is loaded to the optical fiber 32 which consists of said core layer 33 to which $GeO_2$ is doped, said 1st cladding layer 34 to which $B_2O_3$ is doped, and said 2nd cladding layer 35 to which F is doped, by the high pressure. Afterwards, ultraviolet rays are irradiated to the predetermined part of the core layer 33 of the optical fiber 32 at a constant period along the direction of the fiber axis. In this embodiment, the period of grating is about 400 µm. Therefore a grating region LPG 310 with a period of about 400 µm is formed in core layer 33.

The ultraviolet rays of the argon laser are irradiated to core layer 33 periodically through the mask which has the slit formed at a constant period.

In FIG. 3-2, the dimensions and the refractive index profile (show in dashed curve) of the optical fiber 32 are outlined.

Core layer 33 has a diameter $d_{31}$ of about 10 µm and the 1st cladding layer 34 has a diameter $d_{32}$ (diameter of 1st cladding layer 34 including core layer 33) of about 60-80 µm. Moreover, 2nd cladding layer 35 has a diameter $d_{33}$ (diameter of 2nd cladding layer 35 including core layer 33 and 1st cladding layer 34) of about 125 µm.

The refractive index of the core layer 33, the refractive index of 1st cladding layer 34, and the refractive index of 2nd cladding layer 35 changed in steps.

That is, $GeO_2$, which increases the refractive index, is doped to core layer 33, $B_2O_3$, which decreases the refractive index, is doped to the 1st cladding layer 34 and F, which decreases the refractive index, is doped to the 2nd cladding layer 35.

In this embodiment, the doping concentration of $GeO_2$ in the core layer 33 (for instance, 0.35%) and the difference of the refractive index $\Delta 1$ are predetermined so that the mode field diameter of core layer 33 is enlarged and the dispersion in the wavelength band of the incidence optical signals is suppressed, as shown in FIG. 3-2.

Moreover, the doping concentration of $B_2O_3$ to the 1st cladding layer 34 and that of F to the 2nd cladding layer 35 have been predetermined, for instance about 0.3%, so that the difference of the refractive index $\Delta 2$ of the 1st cladding layer 34 and the 2nd cladding layer 35 confines the cladding modes of the optical signal within the 1st cladding layer, as shown in FIG. 3-2.

Next, the action of the LPG component 31 and the optical fiber for LPG 32 in this embodiment are explained.

First of all, it explains the filter action of LPG component 31.

The propagation mode of the optical signals, which has a specific wavelength band, radiated from the core layer 33 to the 1st cladding layer 34 can be coupled with the cladding modes S31, S32 propagated in the 1st cladding layer 34 by the LPG 310 formed in the core layer 33 of optical fiber for LPG 32, as shown in FIG. 3-1. Consequently, transmission loss of optical signals increased in a predetermined wavelength band when the optical signals are coupled with the cladding modes S31 and S32.

Therefore, LPG components 31 having LPG 310, functions as isolator and gain equalizer, which has the desired wavelength isolation band (wavelength transmission loss band).

Next, the specific function of this embodiment is explained.

If the amount of the wavelength shift of the center wavelength based on the temperature change of said LPG 310 is increased, a variation of the transmission loss profile can be increased. As a result, it is possible to make it correspond to a dynamic profile change of temperature and change with the passage of time of the gain profile of EDFA.

To increase the temperature dependency of the center wavelength of LPG 310, it only has to increase the temperature coefficient of LPG 310.

As mentioned earlier, $GeO_2$, which has the positive temperature co-efficient of refractive index, is doped to the core layer 33 of the optical fiber for LPG 32 of the LPG component 31 and, $B_2O_3$, which has the a negative temperature co-efficient of refractive index, is doped to the 1st cladding layer 34 in this embodiment, the absolute value of the refractive indices being the same in both cases.

That is, the difference of the temperature dependency of the refractive index of core layer 33 and 1st cladding layer 34 increases because the temperature co-efficient of the refractive index in the core layer 33 is a positive value, and the temperature co-efficient of the refractive index of the 1st cladding layer 34 is a negative value. As a result, the thermal gradient between core layer 33 and the 1st cladding layer 34 can be increased.

Even when $GeO_2$, which has the refractive index with a positive temperature co-efficient, is doped in the core layer 33, and $B_2O_3$ which has the refractive index with a negative temperature co-efficient, is doped in the 1st cladding layer 34, the refractive index profile which can propagate the propagation mode of the optical signal in the core layer 33 can be set, as shown in FIG. 3-2.

Then, LPG 310 is formed in the optical fiber for LPG 32, with a large difference between the temperature co-efficient of the core layer 33 and that of the 1st cladding layer 34, in this embodiment.

The temperature co-efficient of LPG 310 is a function of the product the difference between the effective temperature co-efficient of said core layer 33 and that of the 1st cladding layer 34 in this embodiment and the period of grating.

Therefore, increasing the temperature coefficient of LPG 310 based on the difference of the temperature co-efficient of the core layer 33 and the 1st cladding layer 34 becomes possible.

Here, FIG. 3-3 shows the result of actually measuring the amount of the wavelength shift of the center wavelength of LPG 310 in LPG component 31 with the temperature change, in this embodiment.

The amount of the wavelength shift based on the temperature change (temperature dependency) of the center wavelength of LPG 310 can be set to about 0.25 nm/° C., as shown in FIG. 3-3.

It is understood that the amount of the wavelength shift (about 0.25 nm/° C.) of the center wavelength, based on the temperature change, of the LPG 310 of this embodiment is five times higher compared with that of an LPG having conventional SMF (about 0.05 nm/° C.).

And, in FIG. 3-4, the temperature characteristics (temperature dependency of transmission loss profile; transmission loss-wavelength characteristic of −5° C., 5° C., 25° C., 45° C., and 65° C.) of LPG 310 of LPG component 31 of this embodiment are shown.

It is possible to increase the temperature dependency of the center wavelength (temperature dependent wavelength shift characteristic) in LPG 310, as shown in FIG. 3-4 (−5° C.→65° C. is about 18 nm).

Therefore, a profile variation corresponding to the temperature change of the transmission loss profile of LPG 310 can be set to be sufficient enough to compensate for a dynamic gain profile variation of EDFA corresponding to the temperature change and the passage of time, as shown in FIG. 3-4.

As a result, D-GEQ which makes compensate for the dynamic fluctuation of the gain profile of EDFA with the change in temperature and with the passage of time can be produced by using LPG component 31 of this embodiment.

Though the doping material in the core layer 33 is assumed to be $GeO_2$ in this embodiment, this invention is not limited only to this. It is possible to use the other materials, which have the refractive index higher than that of the core layer 33 (silica layer), and positive temperature co-efficient, and also photosensitivity.

Though the doping material of the 1st cladding layer 34 is assumed to be $B_2O_3$, this invention is not limited only to this. The other materials, which have refractive index lower than that of the silica layer, which is the base material of cladding layer 34, a negative temperature co-efficient that can cancel said positive temperature co-efficient, can be used.

It is preferable that the difference between the absolute value of a positive temperature co-efficient of the doping material in core layer 33 and the absolute value of a negative temperature co-efficient of 1st cladding layer34 is large.

Moreover, though the doping material of 2nd cladding layer35 is assumed to be F in this embodiment, this invention is not limited only to this and this should be a material, which has smaller refractive index than that 1st cladding layer 34.

Especially, when the doping material to the 2nd cladding layer 35 is the material having refractive index lower than that of 1st cladding mode, the cladding modes S31, S32 of the optical signal propagated in the 1st cladding layer 34 is reflected totally inside at the boundary of the 2nd cladding layer 35 and confined and propagated with in the 1st cladding layer 34 itself, due to said difference of refractive index of 1st cladding layer 34 and 2nd cladding layer 35.

As a result of this, the cladding modes S31, S32 of the optical signal propagated in the 1st cladding layer 34 can be confined with in the 1st cladding layer 34 without depending on the outside environment of 1st cladding layer 34 and the influence of said outside environment on the cladding modes of the optical signal can be prevented.

In addition, though the 1st cladding layer 34 and the 2nd cladding layer 35 are formed by doping $B_2O_3$ and F respectively, in this embodiment, this invention is not limited only to this.

For instance, the material ($B_2O_3$ etc.), which has lower refractive index than the refractive index of the silica layer and a negative temperature co-efficient of refractive index that can cancel out said positive temperature co-efficient of refractive index, is also acceptable as the material doped to cladding layer of one cladding layer structure.

Moreover, co-doping of the cladding layer with two kinds of materials ($B_2O_3$ and F etc.) which have the refractive index lower than the refractive index of the silica layer and a negative temperature co-efficient of refractive index which can cancel out said positive temperature co-efficient, in one cladding layer structure is acceptable.

Though, the gain profile variation of an EDFA corresponding to the change in temperature and to the passage of time is compensated in this embodiment, this compensation is not limited only to this EDFA but may be extended to other optical fiber amplifiers, in this invention.

FIG. 4-1 shows the outline of the LPG component of this invention.

This LPG component is one wherein surrounding of LPG 55 is coated by resin that has high temperature dependency of the refractive index (the temperature coefficient is large), further coated hermetically.

LPG 55, which has grating region 54 where the refractive index modulation is caused, is obtained by irradiating ultraviolet rays to the core layer 52 of the optical fiber 51 in FIG. 4-1. Resin 56 with high temperature co-efficient of refractive index is coated to the surrounding of the cladding layer 53 of this LPG 55. Details of this resin 56 are described later.

The light propagated in the core layer 52 is bent by the diffraction grating in the grating region 54 and as a result, it is propagated to a clad layer. The propagation characteristic of a cladding mode changes and the coupling constant with the fundamental mode changes when the refractive index of the resin 56 which surrounds the circumference of the cladding layer 53 changes. Therefore, the transmission loss profile of this LPG55 changes, and the slope of transmission loss profile changes. The relation of the temperature change of this resin 56 and the change of the slope of the transmission loss profile of LPG 55 is explained in detail at a latter part.

It is necessary to change the temperature of resin 56 to change the refractive index of this resin 56. The methods of changing the temperature of the resin 56 are like for instance, changing the ambient temperature of LPG55, by, for instance setting up heaters and/or varying the temperature of the heaters, etc. The refractive index changes by the temperature dependency of the refractive index of the resin 56, when the temperature of resin 56 changes.

Moreover, when the temperature of the resin 56 is changed by said method, the temperature of the core layer 52 also changes by the thermal conduction, etc. The problem of change of the center wavelength of the transmission loss by the temperature change of resin 56 occurs because LPG 55 has the temperature dependency of the center wavelength. The co-doping of $GeO_2$ and $B_2O_3$ to the core layer 52 is effective to solve this problem. The detailed account is given later.

In addition, the change of a long-term transmission loss profile occurs due to the change in the field environment (temperature and humidity, etc.) of LPG 55. This is a problem of degrading the long-term reliability of LPG 55.

It is effective to provide hermetic coating 57 to the surroundings of resin 56 of LPG 55 as a measure to overcome this. As hermetic coating 57, both the metal coating and the carbon coating are acceptable. The change of a long-term transmission loss profile by the temperature change etc. of LPG 55 can be suppressed by this hermetic coating 57. Details are described later.

FIG. 4-2 shows the refractive index profile of the LPG of this invention along the radial direction. To reduce the center wavelength shift by the change of the temperature of the external environment as much as possible, $GeO_2$ and $B_2O_3$ are co-doped to the core layer. Moreover, the cladding layer is made up of $SiO_2$. The resin with high temperature co-efficient of refractive index is coated in the surrounding of cladding layer, and the metal coating or the carbon coating hermetically covers the outermost layer. The change in the refractive index in radial direction becomes like the profile shown in FIG. 4-2.

Next, a detailed explanation of the resin 56 having high temperature co-efficient of the refractive index is given. As resin 56, which surrounds the cladding layer 53, any material that has bonding characteristic is acceptable. Moreover, the one whose refractive index changes greatly by the temperature change is preferable. In addition, the refractive index of this resin 56 must be always larger than that of $SiO_2$, which is the basic material of the optical fiber.

That is, it is necessary for the resin 56 to have the following requirements (a)-(c):

(a) It is preferable that the temperature co-efficient of the refractive index is $0.001/°C$. or more in the range of 0-65° C. Especially, if the high temperature co-efficient of refractive index of about $0.002/°C$. is obtained, the control of more various gain slopes becomes possible. However, it does not matter whether it is having positive or negative temperature co-efficient. (For instance, both characteristic wherein refractive index increases and decreases according to the increase in the temperature are acceptable).

(b) The refractive index is more than 1.458 of SiO2 in the range of 0-65° C.

(c) The curing, by ultraviolet rays, type resin is the most preferable. Liquid, gel, and solid as the state before curing are acceptable. The refractive index is prioritized.

This suitability of a resin with the above requirements is studied extensively. Epoxy resin has high refractive index, but the temperature co-efficient of refractive index of is small. On the other hand, a silicon resin has a high temperature co-efficient of refractive index, but its refractive index is low. Therefore, if the resin, which mixes both these resins, is used, it is possible to have the temperature co-efficient of the refractive index as high as possible without falling below the refractive index 1.458 of SiO2 within the range of 0-65° C.

Next, the characteristics of the LPG which is coated with the resin with said high temperature co-efficient, around the surroundings of the cladding layer, is explained by using FIG. 4-3A, FIG. 4-3B, FIG. 4-4A, and FIG. 4-4B. The temperature co-efficient of the refractive index of this resin is assumed to be $0.001/°C$., and each transmission loss profile is simulated in case of six kinds of the resin temperature of 0° C., 13° C., 26° C., 39° C., 52° C., and 65° C.

Figures 1, 4:
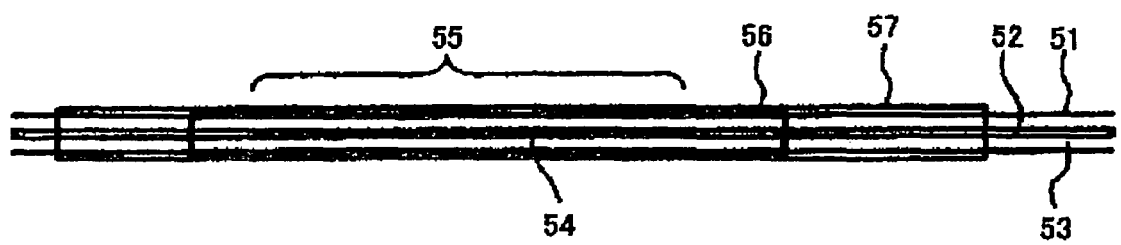
Figures 2, 4:
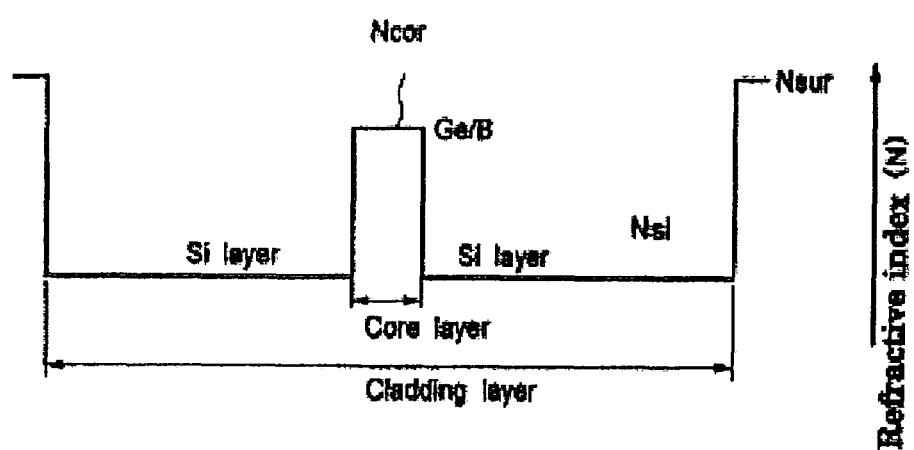
Figures 3A, 4:
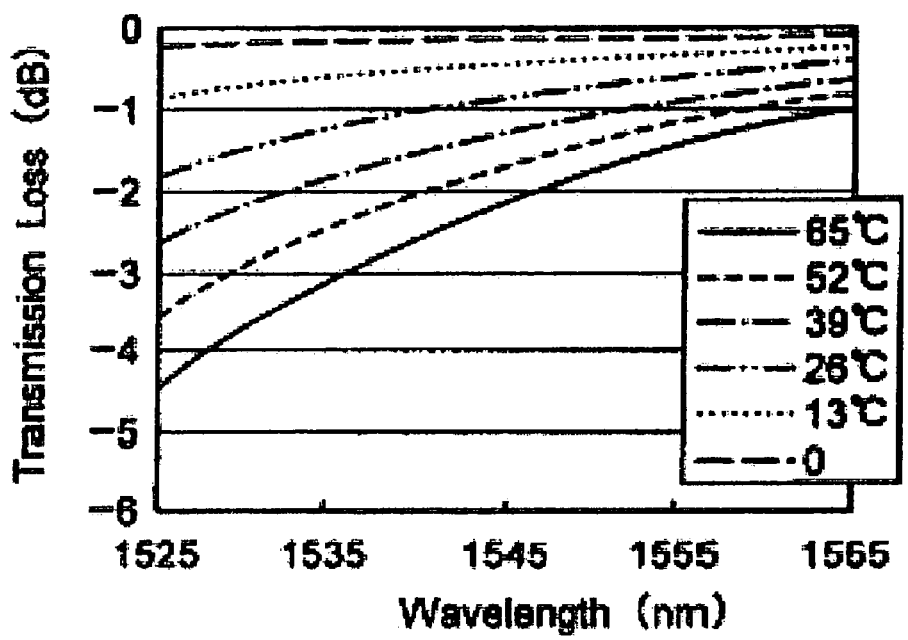
Figures 3B, 4:
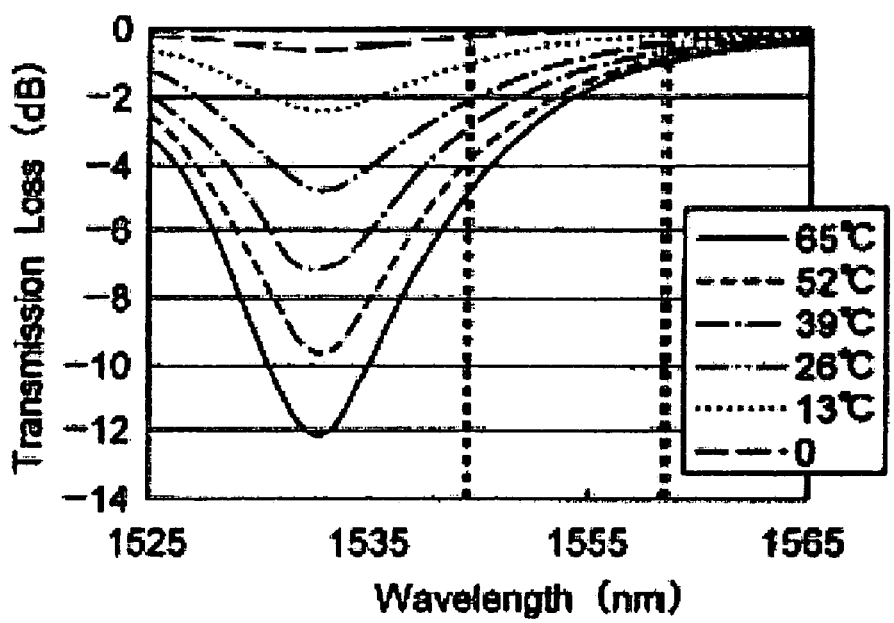
Figures 4, 4A:
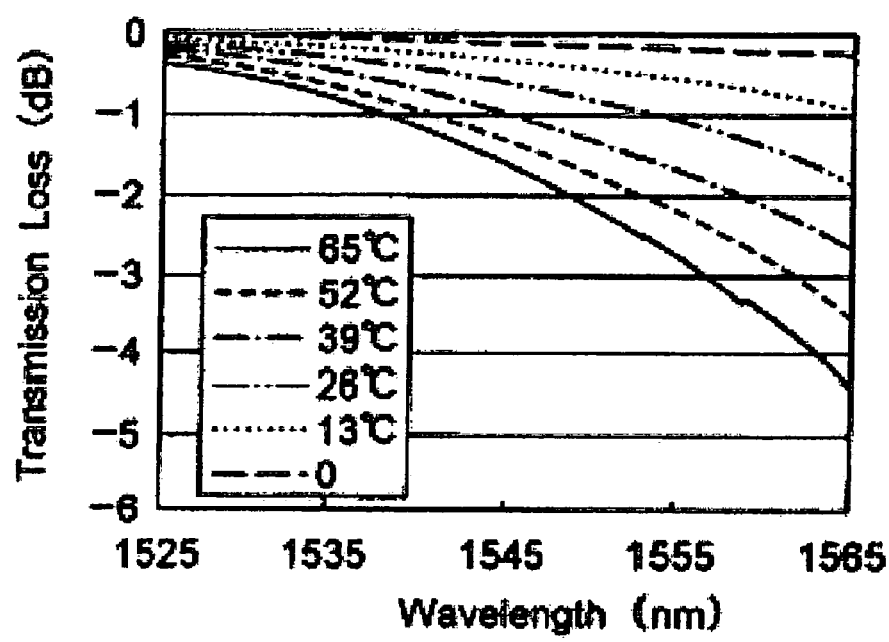
Figures 4, 4B:
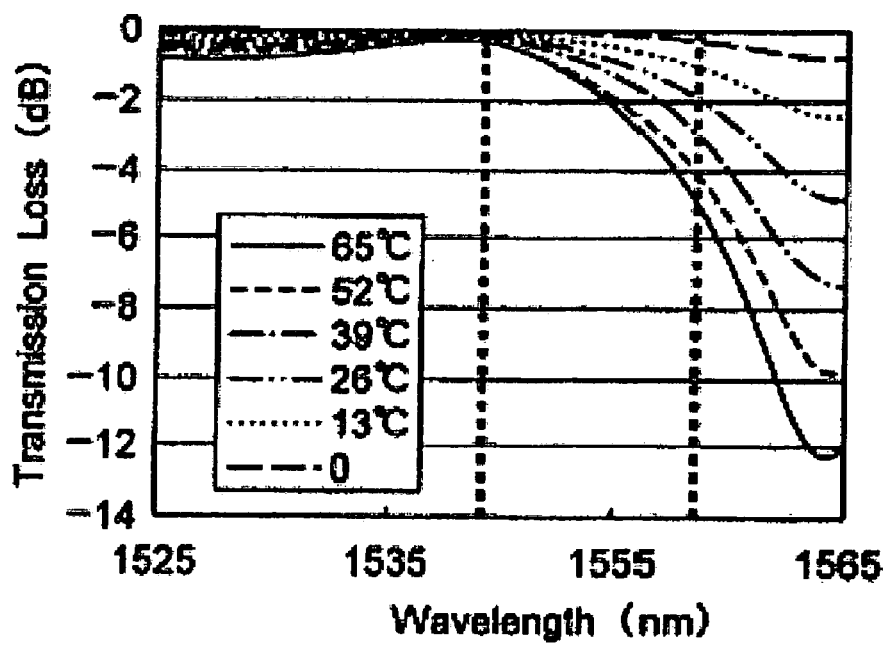
Figures 4, 5:
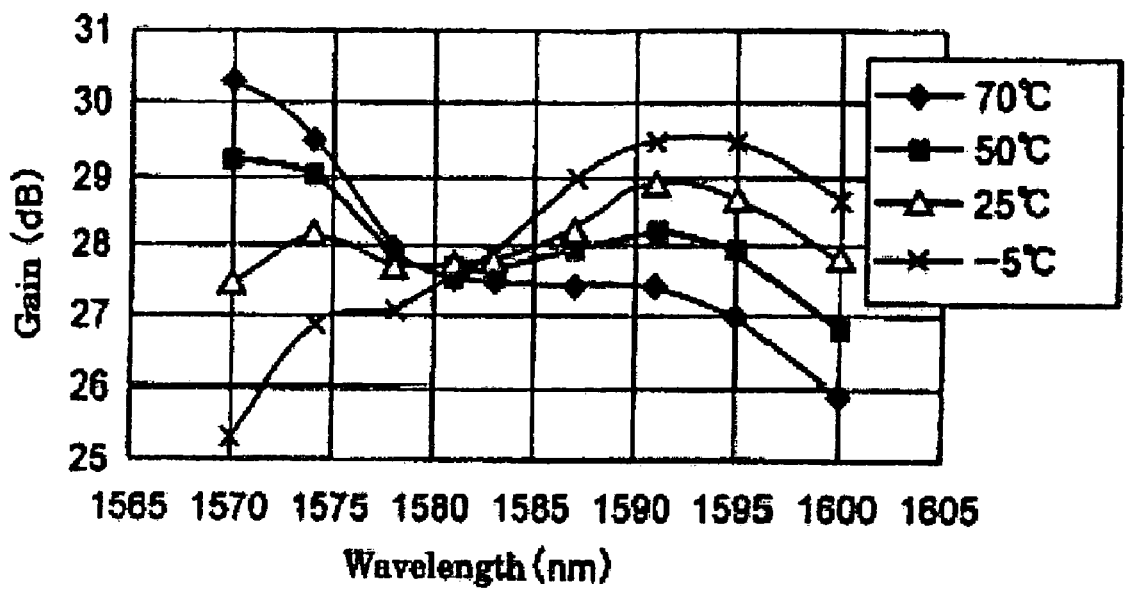
Figures 4, 5, 6:
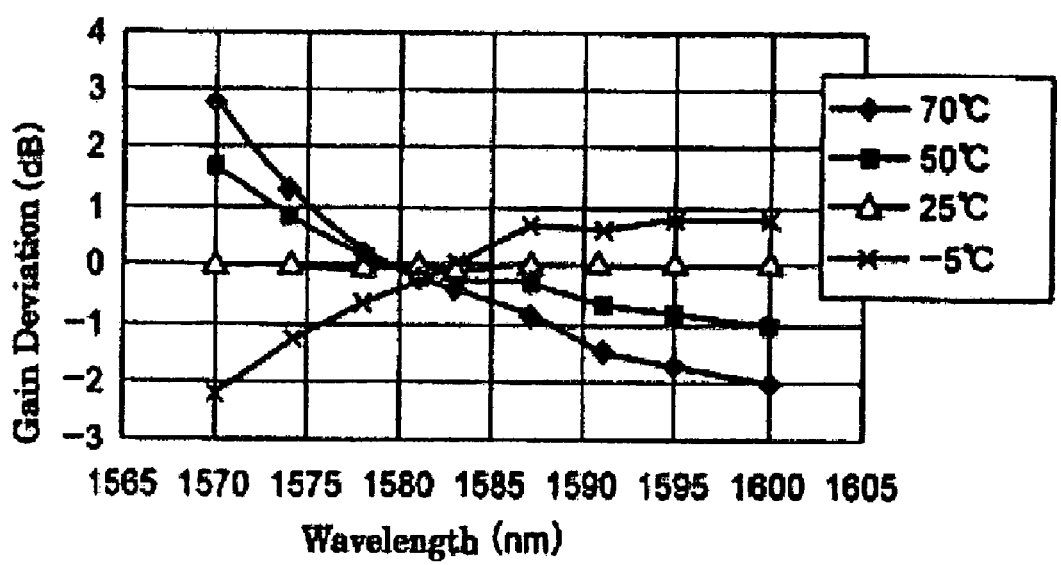
Figures 4, 5, 6, 7:
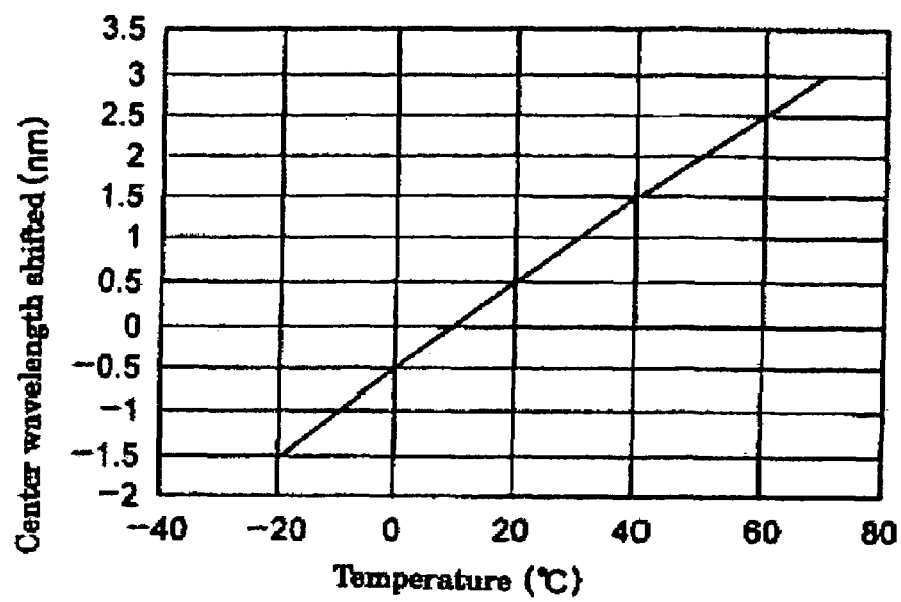
Figures 4, 5, 6, 7, 8:
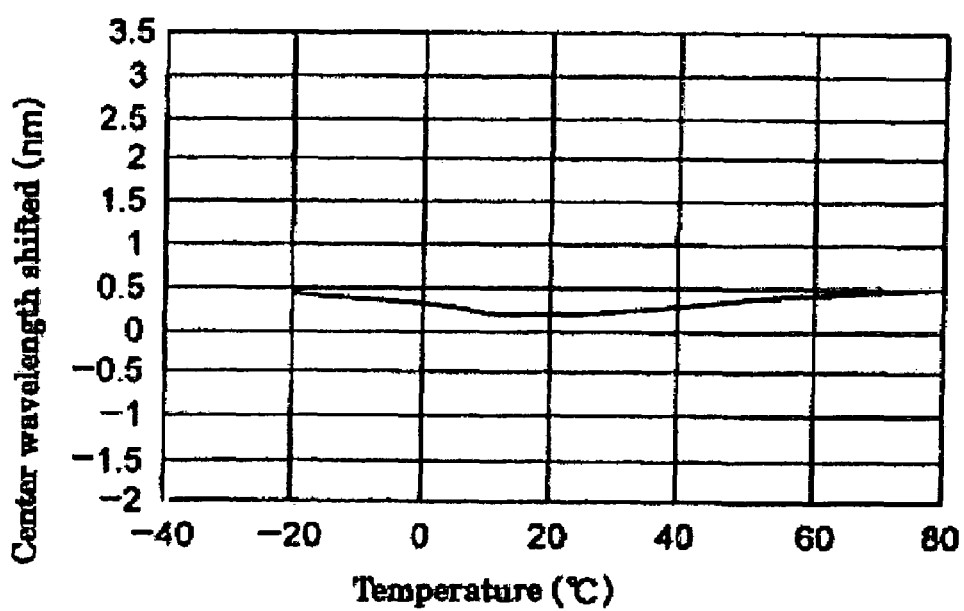
Figures 4, 5, 6, 7, 8, 9:
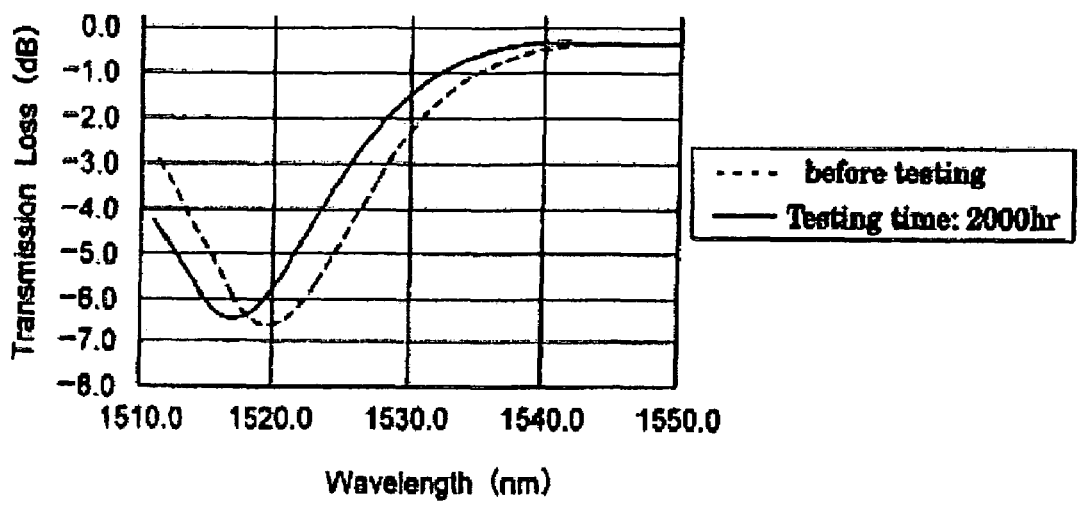
Figures 4, 5, 6, 7, 8, 9, 10:
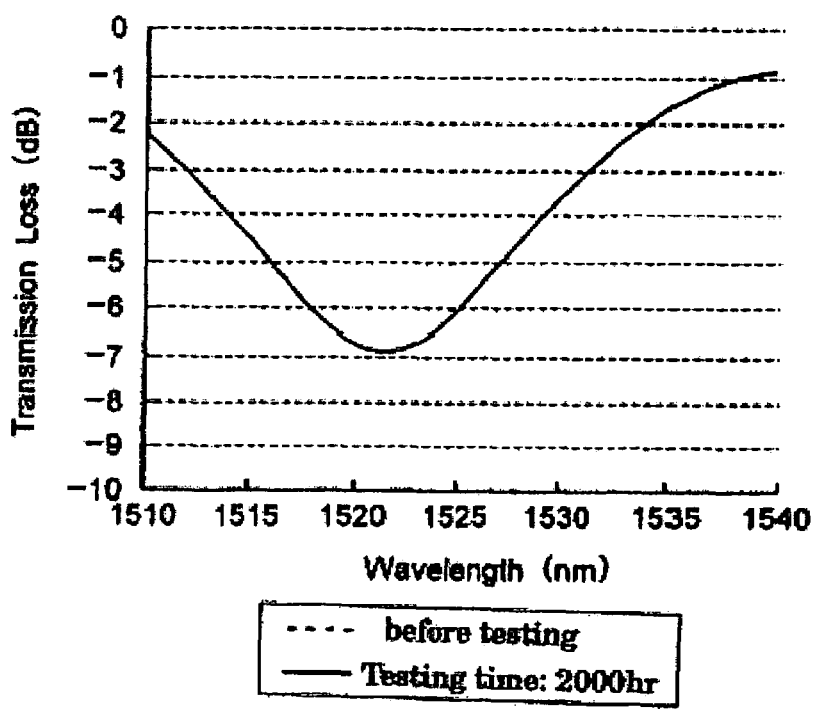
Figures 4, 5, 6, 7, 8, 9, 10, 11:
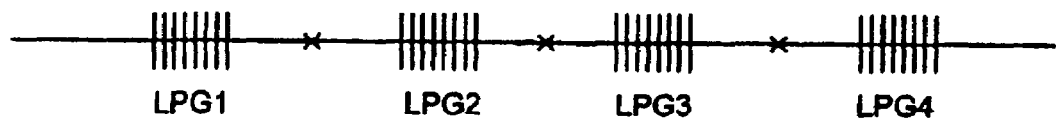
Figures 4, 5, 6, 7, 8, 9, 10, 11, 12, 12A:
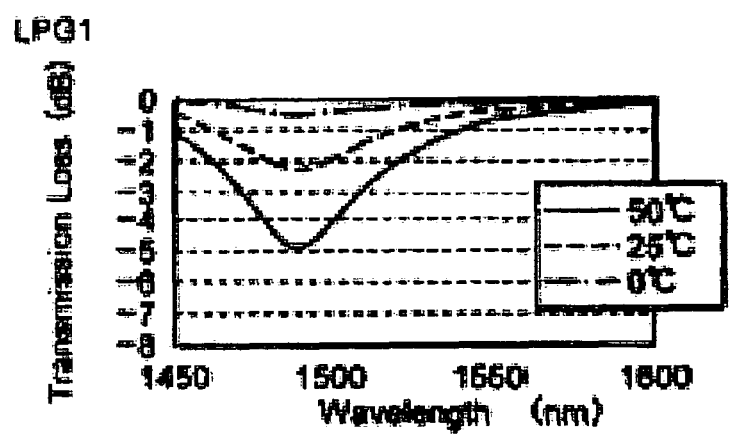
Figures 4, 5, 6, 7, 8, 9, 10, 11, 12, 12B:
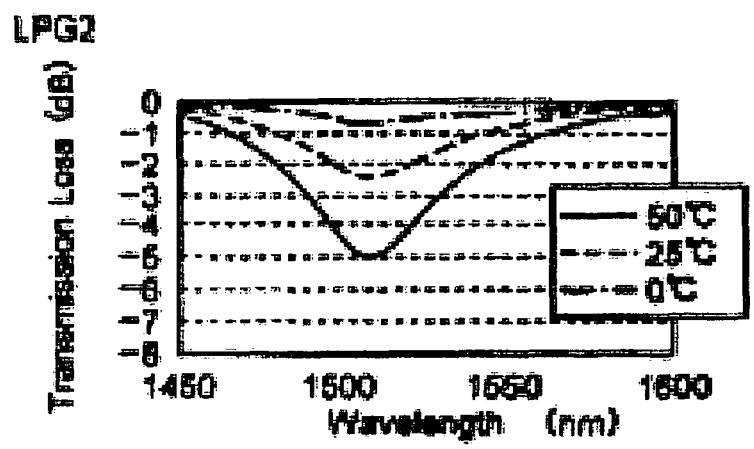
Figures 4, 5, 6, 7, 8, 9, 10, 11, 12, 12C:
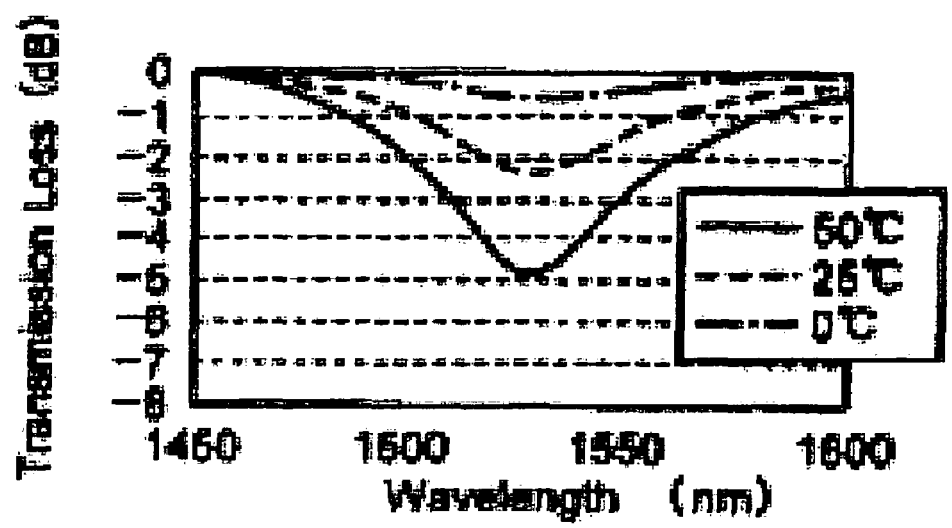
Figures 4, 5, 6, 7, 8, 9, 10, 11, 12, 12D:
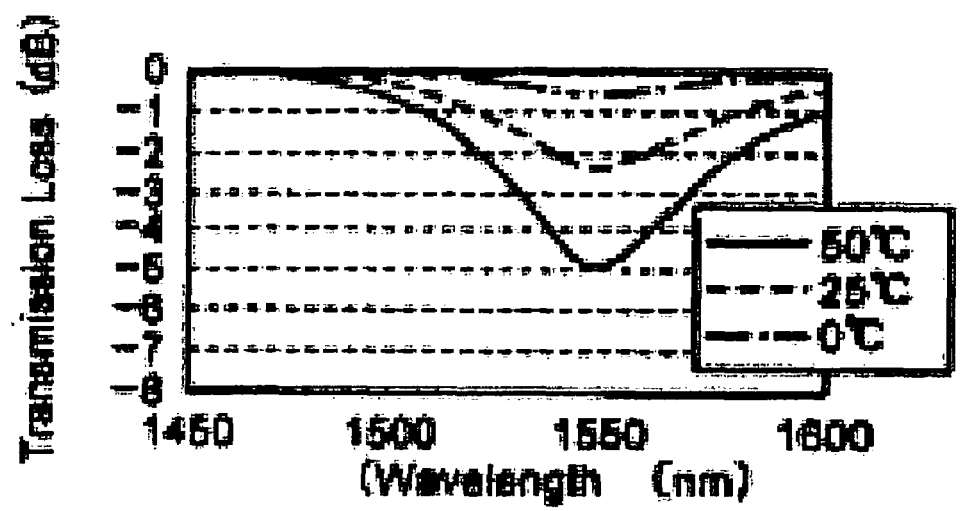
Figures 4, 5, 6, 7, 8, 9, 10, 11, 12, 12E:
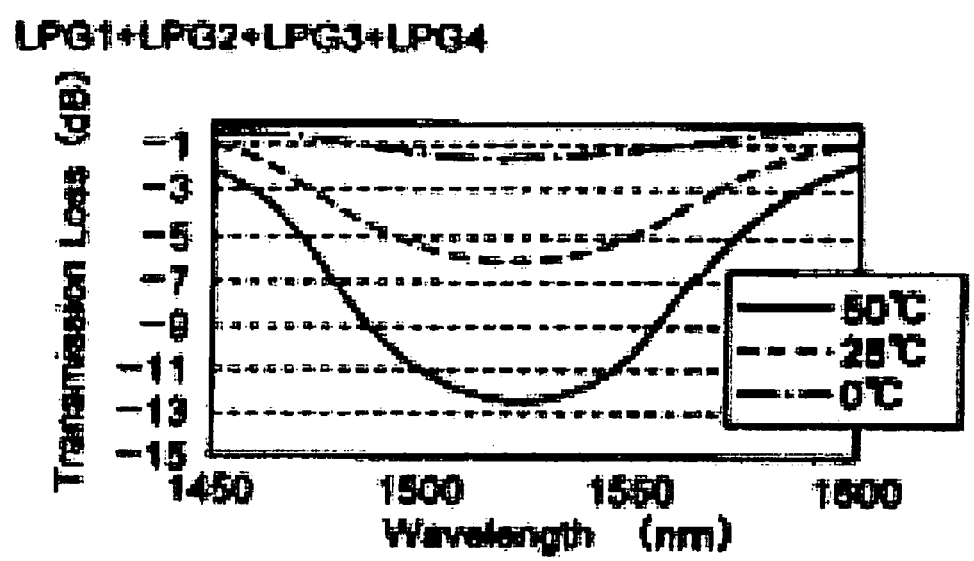

In these graphs, the vertical axis is transmission loss (dB), and the horizontal axis is wavelength (nm). FIG. 4-3A and FIG. 4-4A shows a close-up of the transmission loss profile in the wavelength band from 1525 nm to 1565 nm. FIG. 4-3B, and FIG. 4-4B shows the transmission loss profile in the entire wavelength bands.

The transmission loss profile has a positive slope in the wavelength from 1525 nm to 1565 nm, as shown in FIG. 4-3A. In short, $dT/d\lambda(dB/nm)$ is positive. LPG, which has center wavelength shorter than the operating wavelength band for WDM, as shown in FIG. 4-3B, should be selected, to achieve such a positive slope. The center wavelength should select LPG, which has center wavelength shorter than the operating wavelength band to achieve this as shown in FIG. 4-3B.

When the temperature of the resin is 0° C., the slope of the transmission loss profile is nearly 0 and the slope grows as the temperature goes up. When the temperature of the outer resin rises, the refractive index increases and accordingly the peak value of the transmission loss of LPG also increases, as shown by FIG. 4-3B. It is understood that according to this, the slope of the transmission loss profile in the wavelength band grows as the temperature rises.

If LPG which has the characteristic shown in FIG. 4-3A and FIG. 4-3B is combined with EDFA, the controlling of the slope of the gain profile of EDFA to be positive can be achieved.

Especially, in the case when the gain profile of EDFA in the wavelength band is having a negative slope, in other words, when $dG/d\lambda(dB/nm)$ is negative, LPG with the characteristic shown in FIG. 4-3A and FIG. 4-3B is effective. Theoretically, gain profile can be maintained flat when $dG/d\lambda = -dT/d\lambda$, in the same wavelength region.

Therefore, it only has to detect the slope $(dG/d\lambda)$ of EDFA caused by the change in the temperature and change in the input power into the EDFA and, provide adequate slope $(dT/d\lambda)$ of LPG to compensate it. In short, controlling the temperature of the resin, which surrounds the circumference of the LPG, the slope of the transmission loss profile can be controlled. As a result, flat gain profile of the EDFA can be obtained in the operating wavelength band of WDM.

The slope of transmission loss profile changes within the range of from almost 0 dB/nm to about 0.25 dB/nm within the range of the temperature of 0 to 65° C. of the resin. Therefore, it is considered that, if the temperature is changed in this range, it is possible to respond adequately to the actually generated change of slope of the gain of EDFA.

Next, FIG. 4-4A and FIG. 4-4B indicates the case where the transmission loss profile has the negative slope in the operating wavelength band from 1525 nm to 1565 nm, that is, $dT/d\lambda(dB/nm)$ becomes negative. To achieve said negative slope, it is necessary to select LPG whose center wavelength of the transmission loss is longer than that of the operating wavelength band as shown in FIG. 4-4B.

When the temperature of the resin is 0° C., the slope of the transmission loss profile is near 0. The slope (in the negative direction) grows as the temperature goes up. The reason for this is that when the temperature of the outer resin rises, the refractive index goes up, and the peak value of the transmission loss of LPG increases, as shown in FIG. 4-4B in a whole chart. Therefore, the slope of the transmission loss profile in the operating wavelength band grows (in the negative direction) as the temperature rises.

If LPG which has the characteristic shown in FIG. 4-4A and FIG. 4-4B is combined with EDFA, the controlling of the slope of the gain profile of EDFA to be negative can be achieved.

Especially, in the case when the gain profile of EDFA in the operating wavelength band is having a positive slope, in other words, when $dG/d\lambda(dB/nm)$ is negative, LPG with the characteristic shown in FIG. 4-4A and FIG. 4-4B is effective. Theoretically, the gain profile can be maintained flat when $dG/d\lambda=-dT/d\lambda$, in the same wavelength region.

The slope of the transmission loss profile changes within the range of from almost 0 dB/nm to about −0.25 dB/nm within the range of the temperature of 0 to 65° C. of the resin. Therefore, it is thought that, if the temperature is changed in this range, it is possible to respond adequately to the actually generated change of slope of the gain of EDFA.

Clearly from the above explanations, the slope of the gain profile of EDFA can be arbitrarily controlled by combining the LPG which has transmission loss profile shown in FIG. 4-3A and FIG. 4-3B and LPG which has transmission loss profile shown in FIG. 4-4A and FIG. 4-4B with the EDFA.

Moreover, the flat gain profile of the EDFA can be obtained by controlling the slope of the transmission loss profile of LPG to make $dG/d\lambda=-dT/d\lambda$, regardless of the slope of the gain profile of EDFA being negative or positive. In short, the flat gain profile of EDFA can be achieved by controlling the slope of the transmission loss profile of LPG corresponding to the slope of gain profile of EDFA by changing the temperature and the input power.

Figures 1, 2, 3, 4, 5:
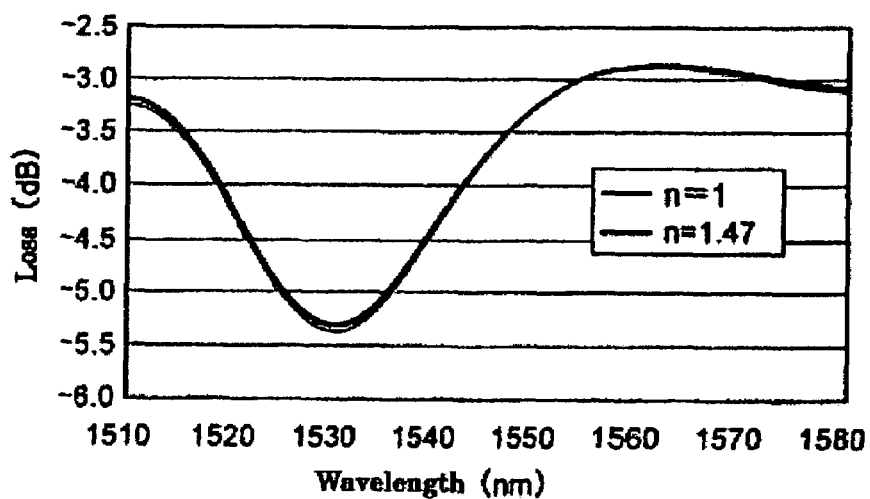

Next, FIG. 4-5 shows the temperature dependency of gain profile of EDFA. The vertical axis is gain (dB), and the horizontal axis is wavelength (nm). FIG. 4-5 shows gain profile at four different temperatures of −5° C., 25° C., 50° C., and 70° C. From the profile of FIG. 4-5, it is understood that the slope of the gain profile of EDFA is considerably large.

Figures 1, 2, 3, 4, 5, 6, 6A:
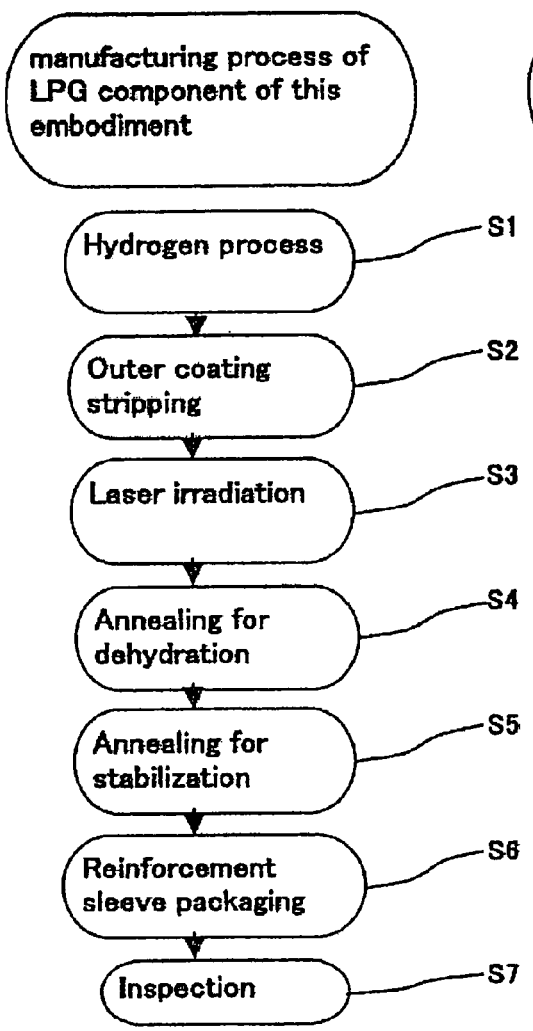
Figures 1, 2, 3, 4, 5, 6, 6B:
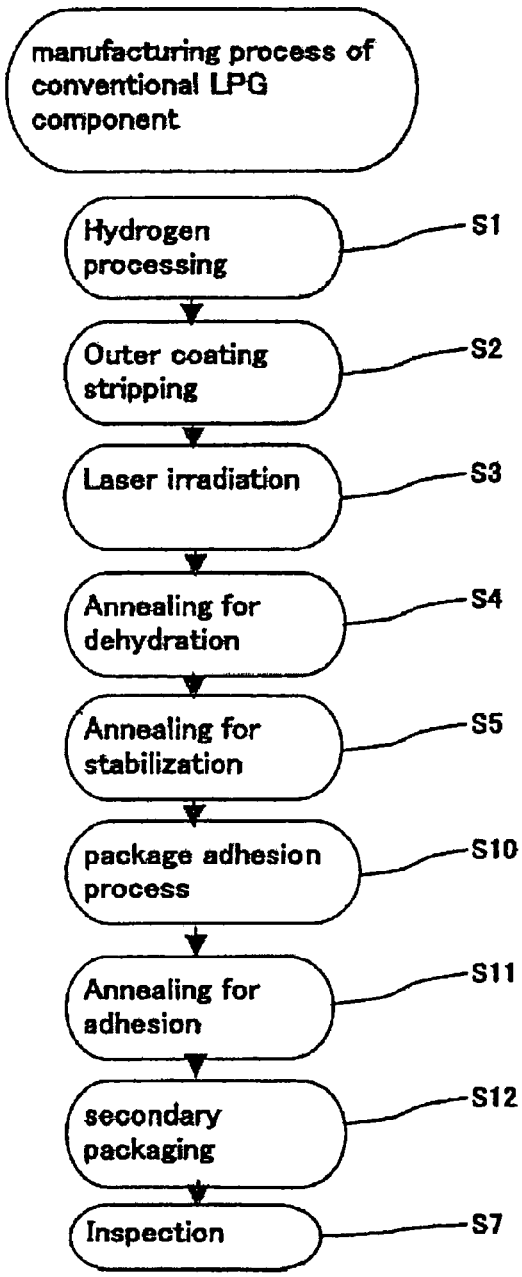
Figures 1, 2, 3, 4, 5, 6, 7:
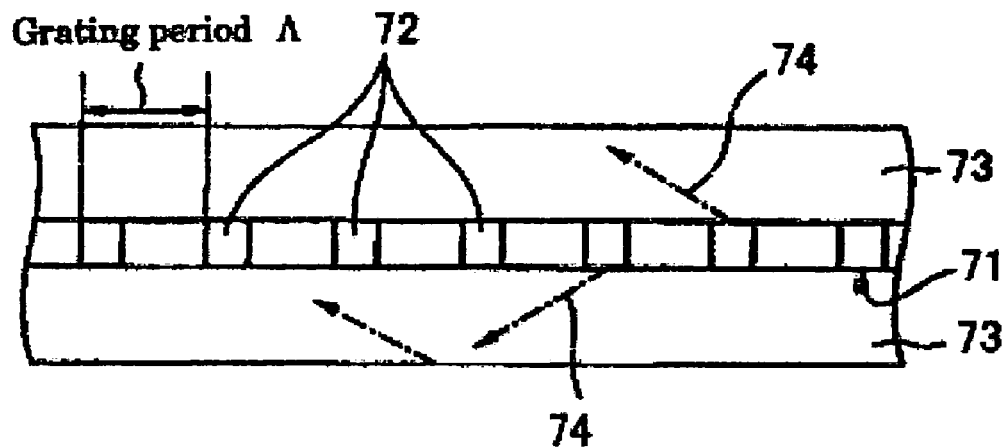
Figures 1, 2, 3, 4, 5, 6, 7, 8:
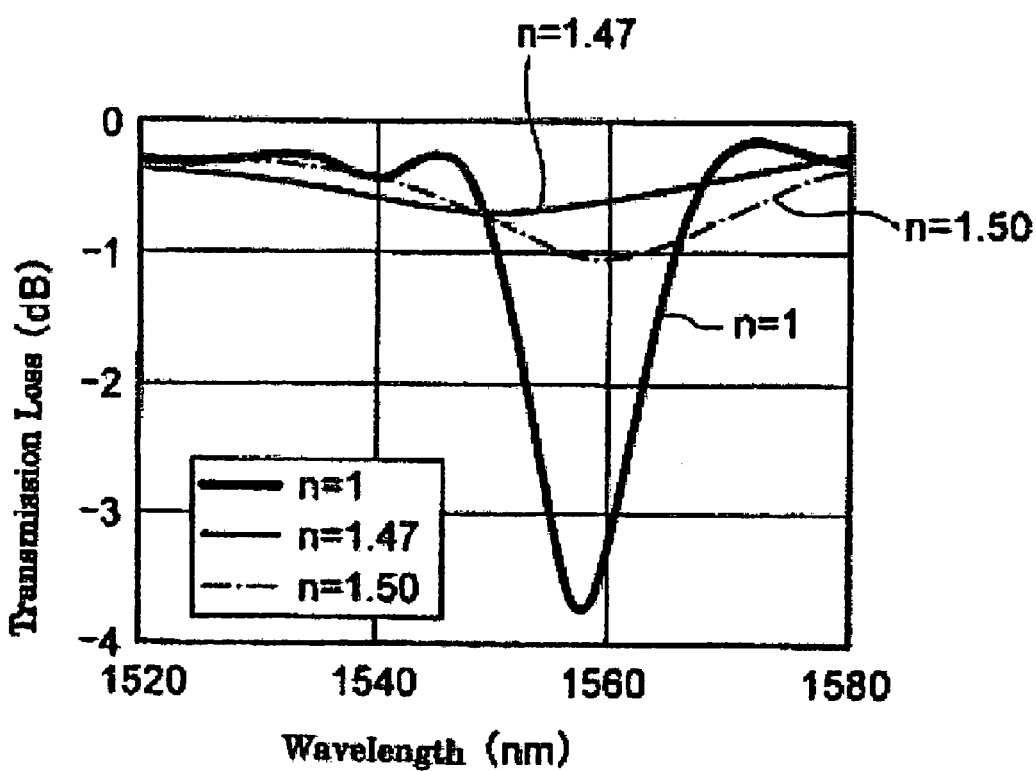
Figures 1, 2, 3, 4, 5, 6, 7, 8, 9:
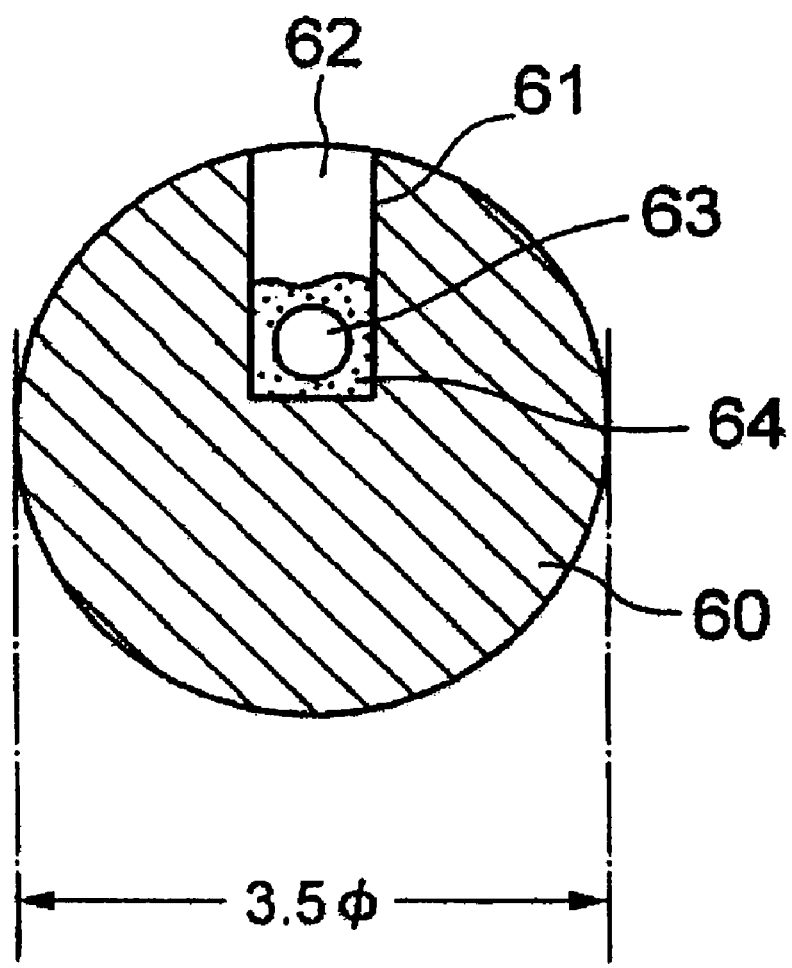
Figures 1, 2:
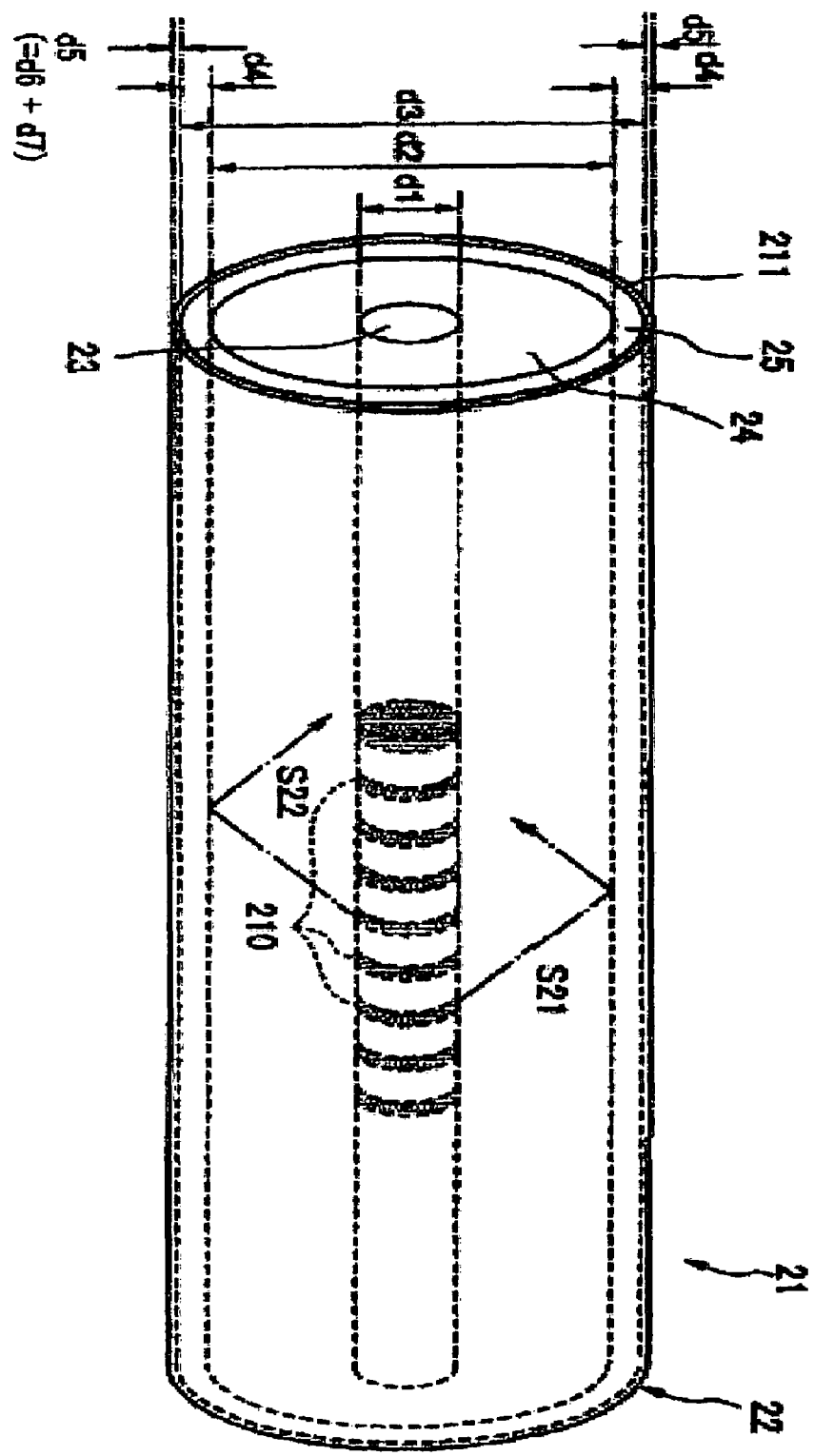
Figure 2:
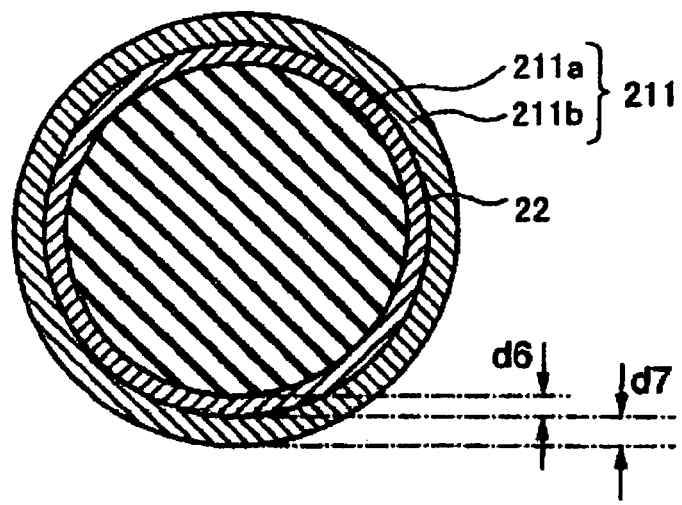
Figures 2, 3:
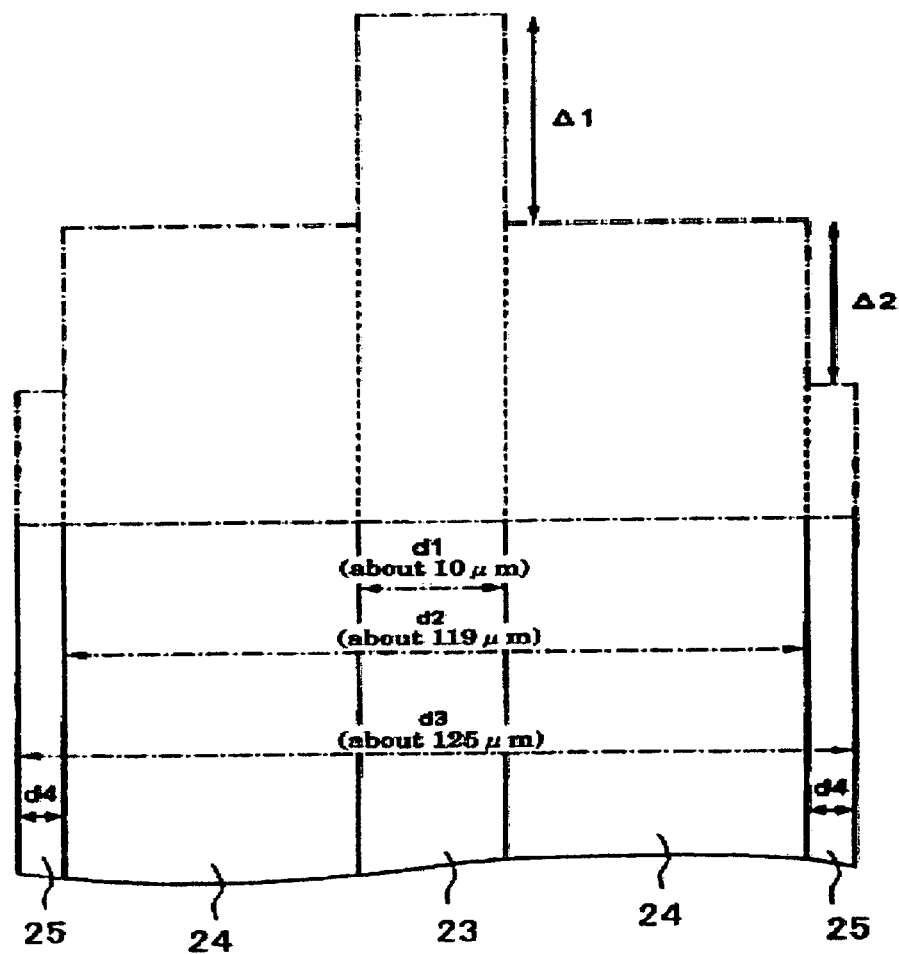
Figures 2, 3, 4:
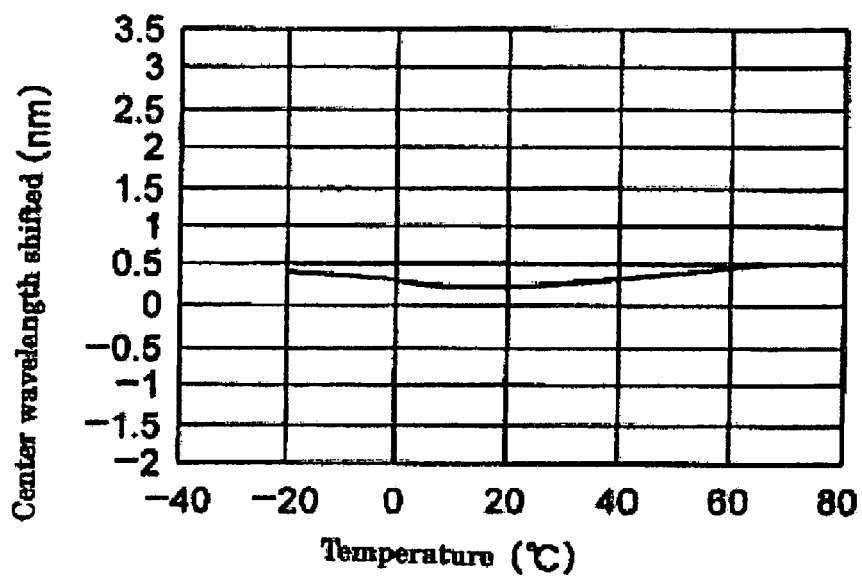
Figures 2, 3, 4, 5:
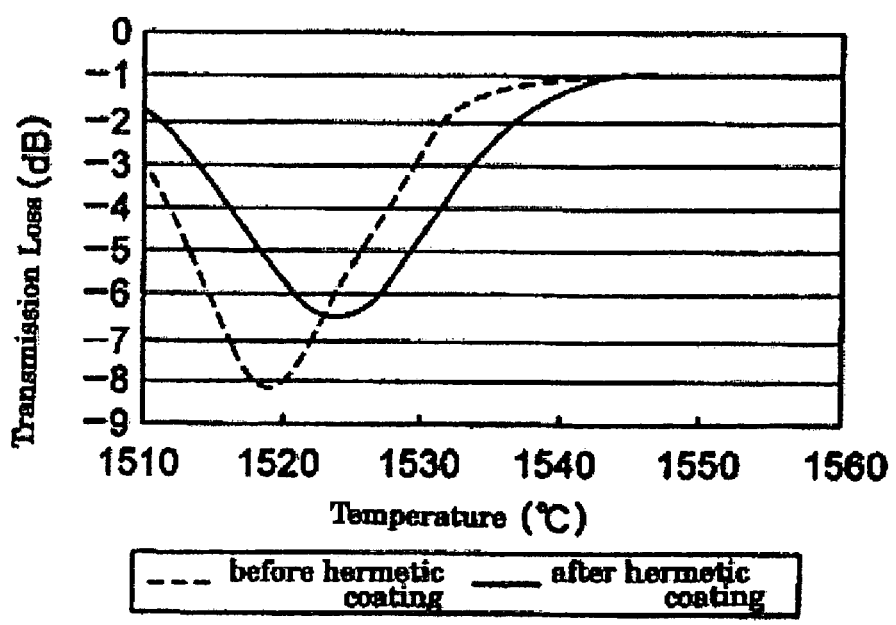
Figures 2, 3, 4, 5, 6:
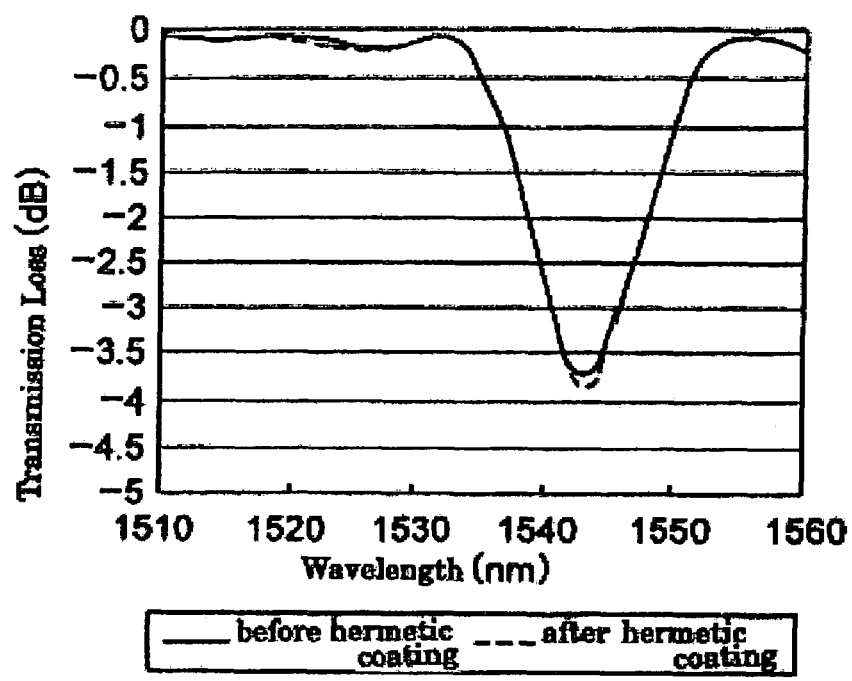
Figures 2, 3, 4, 5, 6, 7:
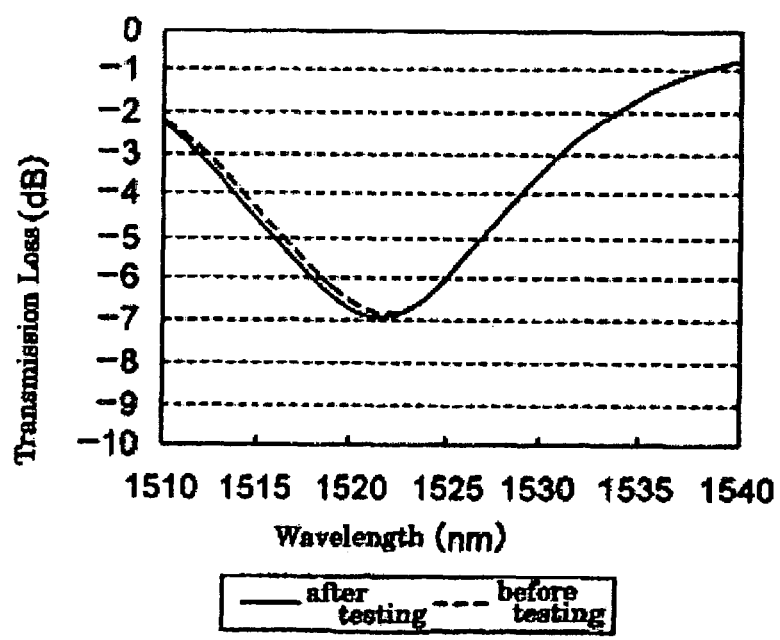
Figures 2, 3, 4, 5, 6, 7, 8:
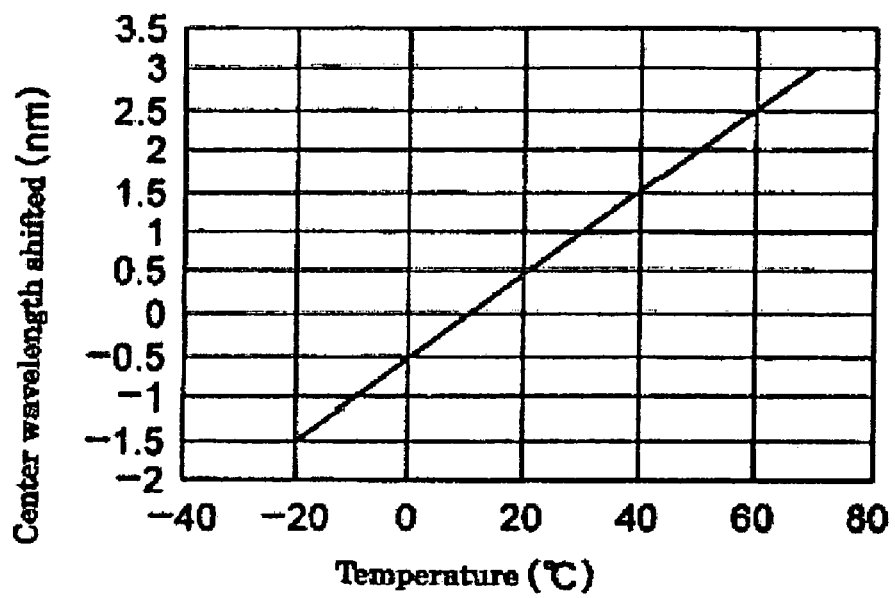
Figures 2, 3, 4, 5, 6, 7, 8, 9:
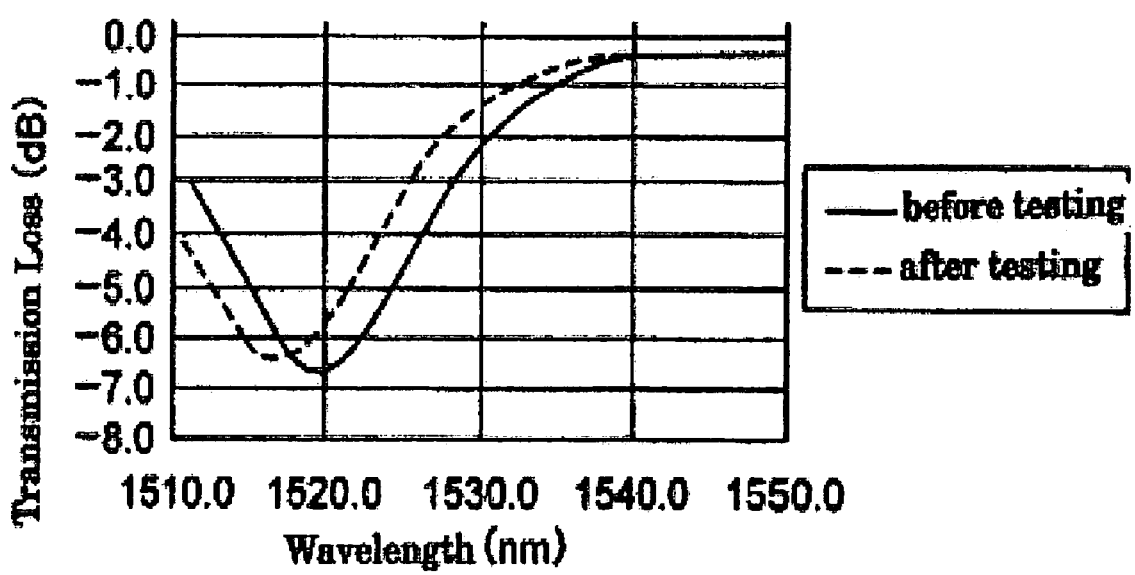
Figures 1, 3:
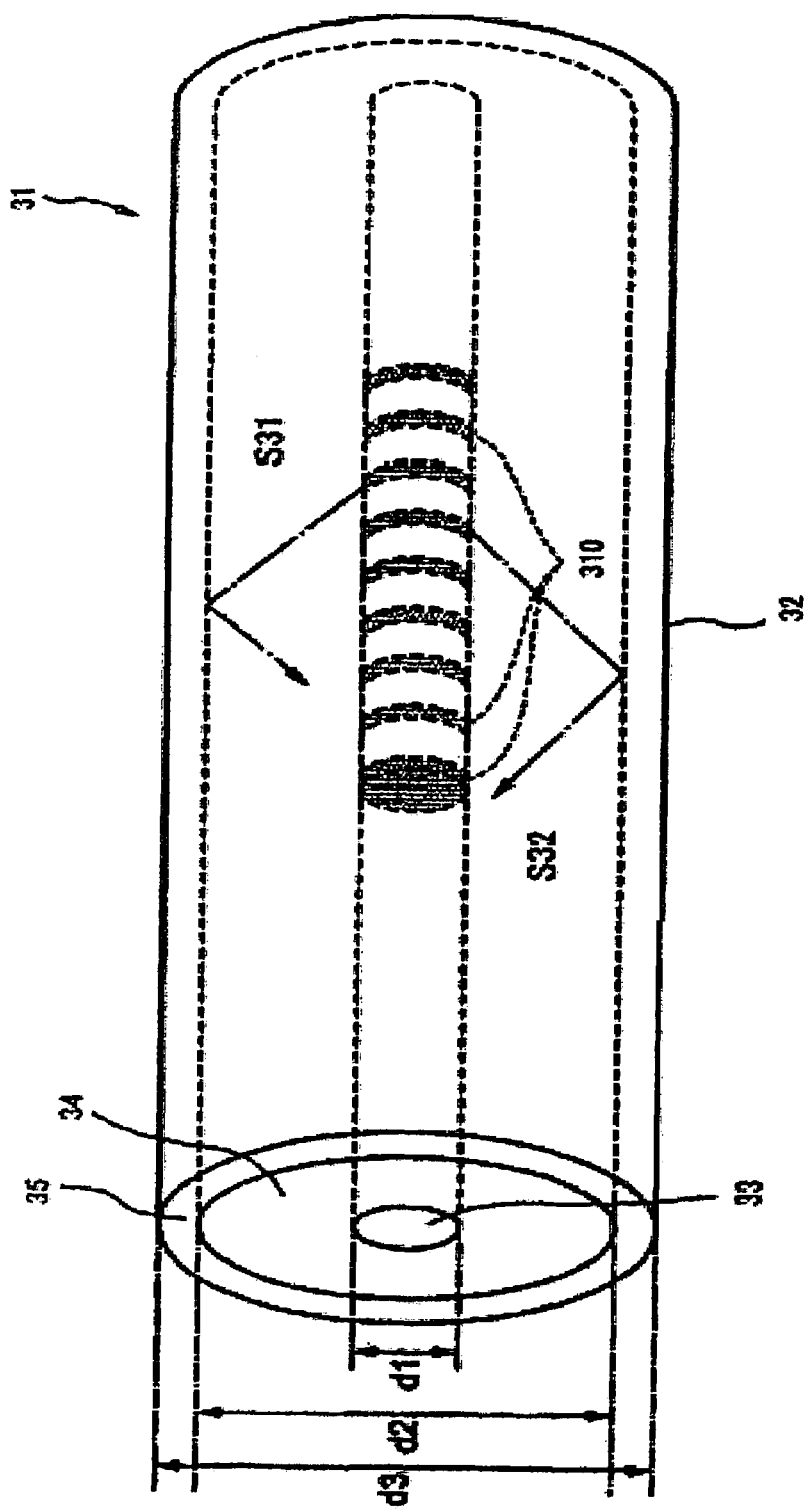
Figures 2, 3:
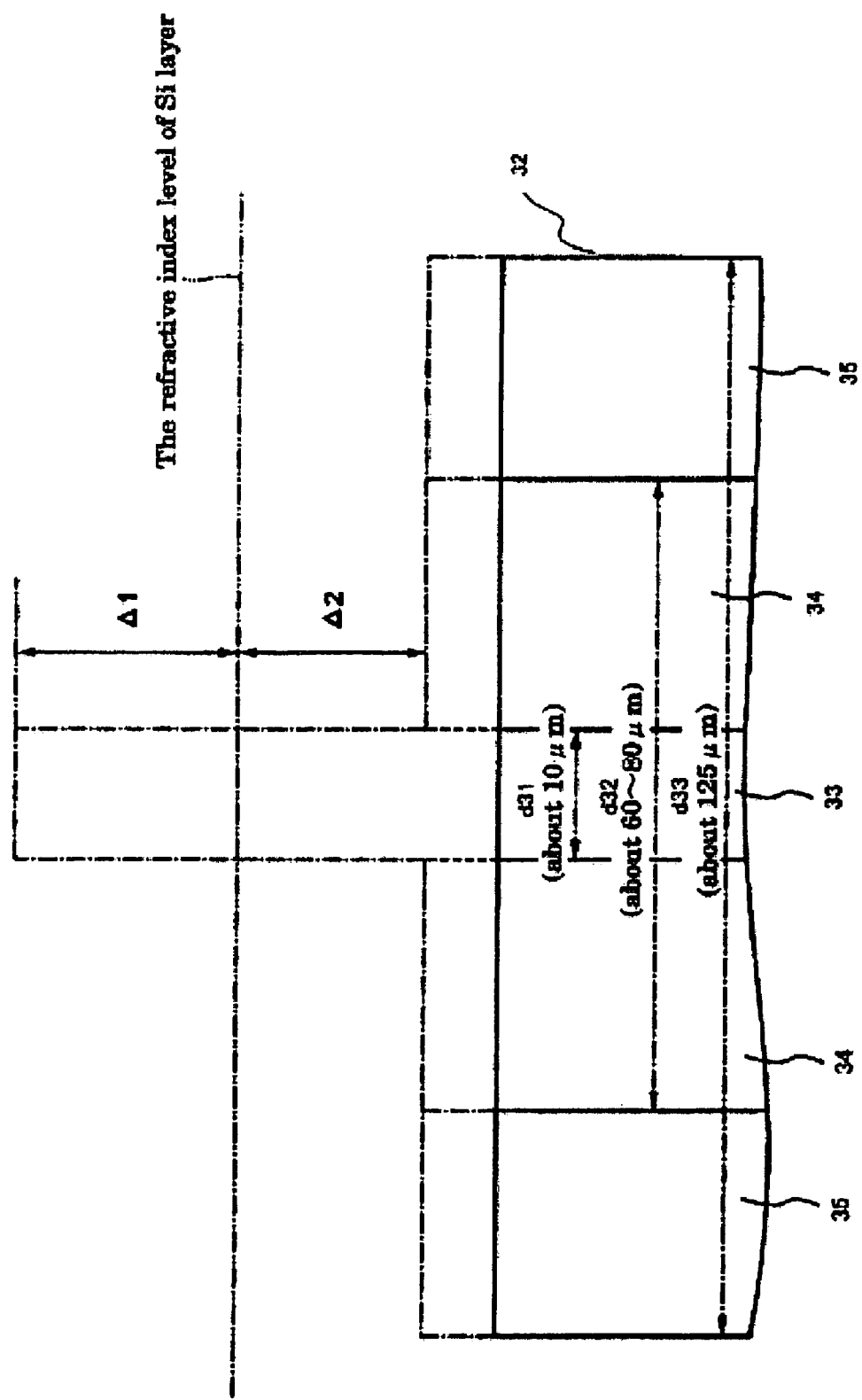
Figure 3:
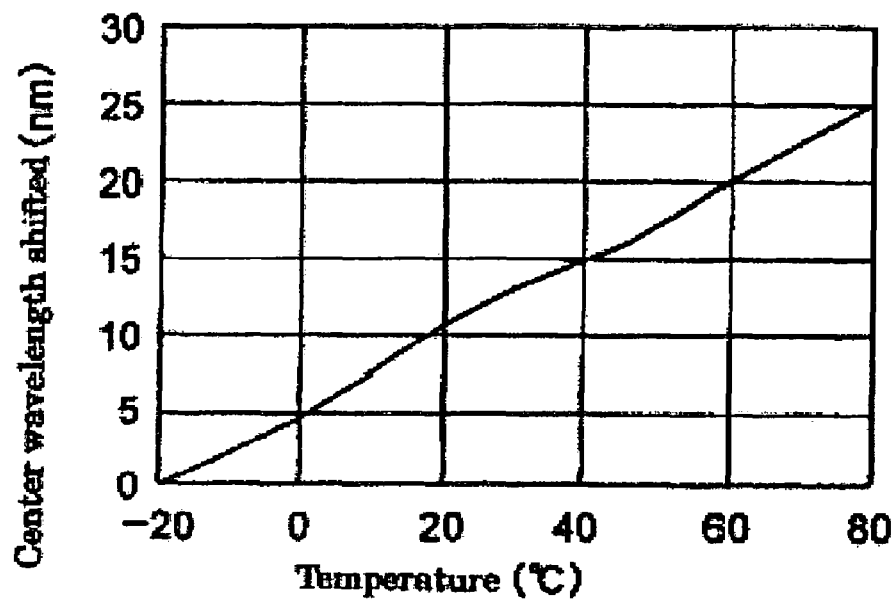
Figures 3, 4:
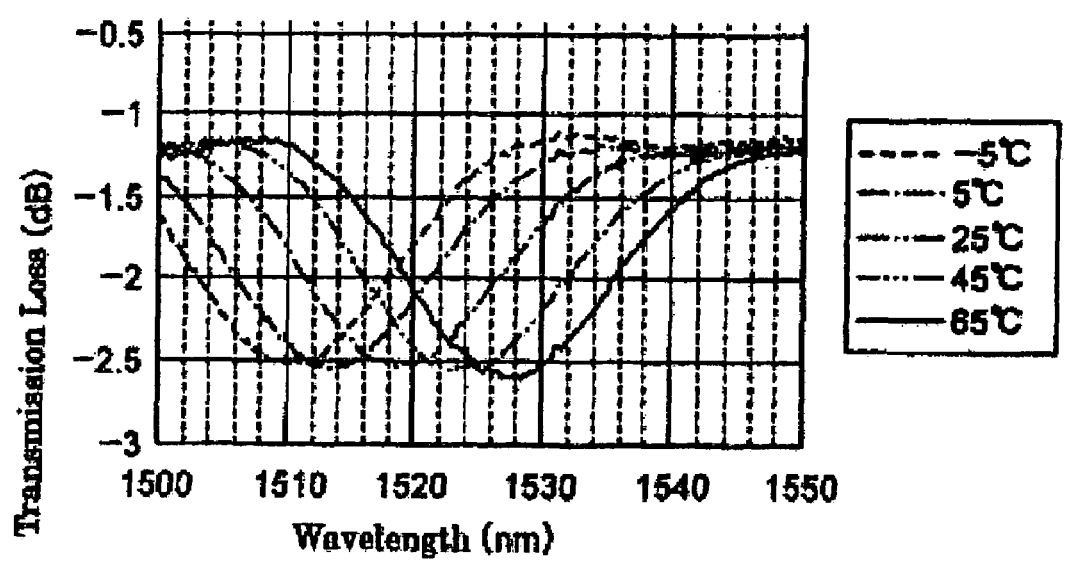
Figures 3, 4, 5:
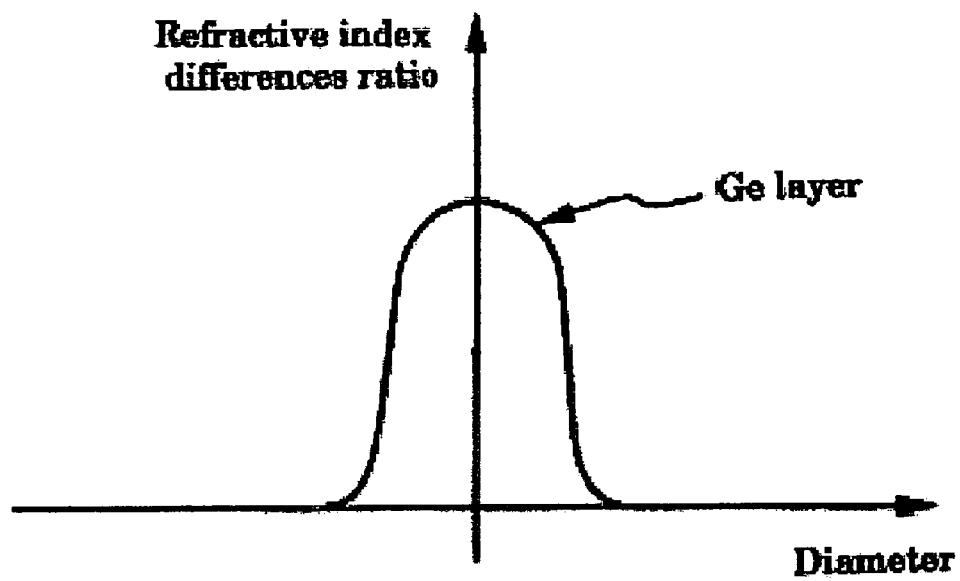
Figures 3, 4, 5, 6:
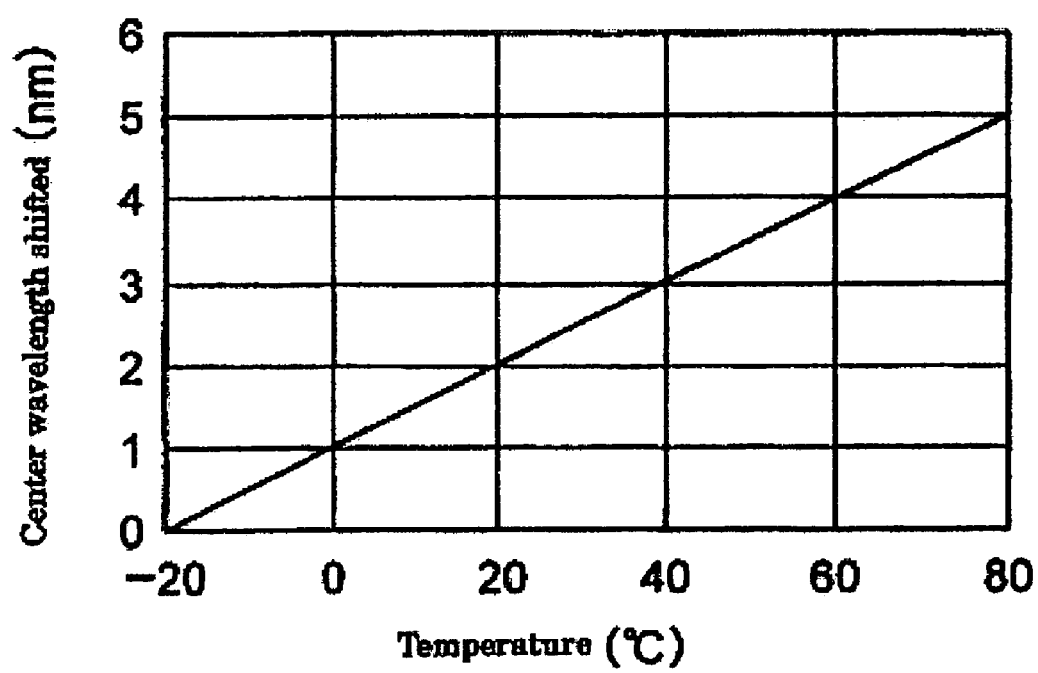

FIG. 4-6 shows the gain profile of EDFA. The same as FIG. 4-5, the vertical axis is gain (dB), and a horizontal axis is wavelength (nm) and gain profile at four different temperatures of −5° C., 25° C., 50° C., and 70° C. It is understood that the slope of the gain profile shown in FIG. 4-6 decreases and approaches flatness compared with FIG. 4-5.

Next, the problem of the shift of the center wavelength of LPG by the change in the temperature of the surrounding is explained.

In this invention, the circumference of the LPG is covered with the resin having high temperature co-efficient of the refractive index. And by changing the ambient temperature, the temperature of this resin is changed which in turn changes the refractive index of the resin. The coupling constant of the cladding mode and the dominant mode changes by the change of the refractive index of this resin. Therefore, the slope of the transmission loss profile can be controlled. However, when the temperature of the resin is changed, the temperature of the fiber also changes inevitably by the thermal conduction, etc.

FIG. 4-7 shows the shift of the center wavelength by the temperature change of LPG. The vertical axis shows shift (nm) of the center wavelength, and a horizontal axis shows the temperature (° C.). The temperature co-efficient of the shift of the center wavelength by the temperature change of LPG is about 50 pm/° C., as shown in FIG. 4-7.

It is effective to co-dope GeO2 and B2O3 to the core layer to solve this problem. The temperature co-efficient of the refractive index of the fiber materials is as shown in Table 1, mentioned above. The positive temperature dependency caused by doping GeO2 to the core layer can be canceled by doping the appropriate quantity of B2O3.

FIG. 4-8 shows the temperature co-efficient of the shift of the center wavelength of LPG of this invention wherein GeO2 and B2O3 are co-doped in the core layer. From it, it can be seen that the temperature co-efficient of the shift of the center wavelength by the temperature change of LPG decreases greatly and temperature dependency of center wavelength is almost 0 in the graph.

Next, the long-term reliability of the LPG of this invention is explained using FIG. 4-9 and FIG. 4-10. FIG. 4-9 shows the transmission loss profile of a conventional LPG, not covered hermetically. The initial characteristics and after 2000 hrs of high humidity test, according to GR-1221, characteristics are compared. It is clear from FIG. 4-9 that the shape of the transmission loss profile has shifted to the short wavelength side after 2000 hrs test.

On the other hand, FIG. 4-10 shows the transmission loss profile of the LPG of this invention, covered hermetically. The initial characteristics and after 2000 hrs of high humidity test, according to GR-1221, characteristics are compared. It is clear from FIG. 4-10 that the shape of the transmission loss profile after 2000 hrs test is almost the same as the initial state. Thus, it can be understood that the hermetic structure is effective towards providing long-term reliability.

Next, it explains the variable loss equalizer using LPG of this invention as an embodiment of the application of this invention.

Four LPGs of LPG1, LPG2, LPG3, and LPG4 of this invention are cascaded as shown in FIG. 4-11. FIG. 4-12 shows the simulation result of transmission loss profile of these LPGs. In this simulation, the temperature co-efficient of refractive index of the resin, which surrounds the circumference of the LPG, is assumed to be 0.002/° C.

Here, transmission loss profile of LPG1, LPG2, LPG3 and LPG4 are shown in FIGS. 4-12A, 4-12B, 4-12C and 4-12D, respectively. In each graph of FIG. 4-12A-D, the vertical axis is transmission loss (dB), and the horizontal axis is wavelength (nm).

Moreover, each graph shows the transmission loss profile for three different temperatures of the outside environment, 0° C., 25° C., and 50° C. LPG1-LPG4 has the same characteristics and same transmission loss profiles with different center wavelengths.

Next, the transmission loss profile when LPGs from LPG1 to LPG4 are connected in cascade, and the temperature of the outside environment is changed, is shown in FIG. 4-12E. It simulated for three different temperatures of the outside environment, 0° C., 25° C., and 50° C.

Clearly in FIG. 4-12E, the transmission loss profile almost becomes flat, and variable loss equalizer can be formed in the wavelength range of 1530 nm-1540 nm. As mentioned above, the transmission loss profile with a high flatness in a predetermined wavelength band can be obtained by combining the slopes of transmission loss profile of LPG of this invention. As a result, various applications such as variable loss equalizers are possible. Though the above example is explained as an embodiment, this invention is not limited only to this embodiment, but, in addition, can be extended to a variety of embodiments. The air layer need not be put in the surroundings of 1st cladding layer according to the optical fiber for LPG, LPG component, and the process of manufacture related to this invention as described above, because the 1st cladding layer surrounded by a 2nd cladding layer which confines the cladding modes of the optical signal which propagates in 1st cladding layer within the 1st cladding layer. Therefore, when such optical fiber for LPG is used, the LPG component can be manufactured without using the adhesive. As a result, the cost of LPG component can be decreased.

Moreover, the long-term reliability of the LPG component can be enhanced by avoiding the influence of the degradation of the adhesive with the passage of time on the optical transmission loss.

In the LPG component of this invention, a 1st material, which has a positive temperature co-efficient of refractive index and a 2nd material that has a negative temperature co-efficient, which cancels the positive temperature co-efficient of the 1st material are co-doped in the core layer of the optical fiber. Therefore, the temperature dependency of refractive index in the core layer can be counterbalanced, and the temperature dependency of the center wavelength can be suppressed greatly.

Moreover, outer part of the 2nd cladding layer of the optical fiber for LPG component is covered hermetically with the coating materials, in this invention. Therefore, the influence of the outside environment of the optical fiber on 1st cladding layer (influence on the cladding modes which are propagated and confined within the 1st cladding layer) can be prevented, and long-term reliability of LPG component can be improved greatly.

In addition, 1st material, which has a positive temperature co-efficient of refractive index, is doped in the core layer, and 2nd material, which has a negative temperature co-efficient, has been added in a cladding portion that surrounds this core layer in the optical fiber for LPG, and a LPG component is formed as another form of this invention.

This can increase the difference between the temperature co-efficient of refractive index of the core layer and that of the clad layer of the optical fiber for LPG. Therefore, the temperature dependency of grating formed to the optical fiber for LPG can be increased based on the difference of the temperature co-efficient in a core layer and a cladding layer.

As a result, producing D-GEQ etc., which compensates for the variation in the gain profile of EDFA due to the change in the temperature and due to the passage of time has become possible, by using the LPG components of this invention.

A plurality of LPG components which are mutually connected in cascade have the optical transmission characteristics which compensate the gain change according to the temperature change in a specific wavelength band of an optical amplifier, as described above.

Therefore, the gain change according to the temperature change in said specific wavelength band of an optical amplifier is counterbalanced by the said optical transmission characteristic, and the gain characteristic of an optical amplifier can be flattened.

It is necessary to adjust the temperature of the entire EDFA to obtain a predetermined gain profile because the slope of gain profile by the temperature change of EDFA cannot be controlled in conventional variable gain equalizer. Therefore, EDFA cannot be miniaturized, and there is also the problem of higher consumption energy of EDFA.

However, if LPG of this invention is combined with EDFA, the slope of gain profile can be controlled, and the temperature adjustment of EDFA becomes unnecessary. Therefore, EDFA can be miniaturized, and the consumption energy of EDFA can be reduced.

In addition, because the slope of gain profile cannot be controlled in conventional variable gain equalizer, final slope of gain profile through the variable gain equalizer cannot be controlled. Therefore, there is a limit in the flatness of the gain profile finally obtained, and it is insufficient to correspond to the increase of the transmission capacity in the future.

However, if LPG of this invention is combined with EDFA, the slope of the gain profile can be controlled, and gain profile with a high flatness, which can correspond sufficiently to the increase of the transmission capacity in the future, can be obtained.

In addition, since $GeO_2$ and $B_2O_3$ are co-doped to the core layer in LPG of this invention, even if the temperature is changed to control the slope of the said gain profile, the shift of the center wavelength of LPG can be prevented.

In addition, in LPG of this invention since the surroundings of the LPG is covered hermetically the above performance can be maintained for long-term without letting the surrounding environment to influence it.

What is claimed is:

1. A LPG component for use with an erbium-doped fiber amplifier (EDFA), the LPG component comprising:
    a grating region including a periodic change of a refractive index along a fiber axis direction in a predetermined part of a core of an optical fiber including said core and a cladding layer surrounding said core,
    said core being doped with a 1st material having a positive temperature co-efficient and sensitive to exposure of ultraviolet light, and
    said cladding layer, having a refractive index lower than that of said core and being doped with a 2nd material having a negative temperature co-efficient,
    wherein a combination of a period of said grating region and a difference between said positive temperature coefficient of said core and said negative temperature coefficient of said cladding layer is configured to provide an increased temperature dependency of a transmission loss profile of said LPG component, said transmission loss profile of said LPG component being designed to shift in a wavelength direction in response to a temperature change so as to substantially compensate for a temperature dependent gain variation of said EDFA.

2. The LPG component according to claim 1 comprising:
    a 2nd cladding layer surrounding the 1st cladding layer covering said core layer wherein, the refractive index of said 2nd cladding layer is lower than that of said 1st cladding layer, and said 2nd cladding layer is doped with a 3rd material having a negative temperature co-efficient of refractive index.

3. The LPG component according to claim 1, wherein a central wavelength of said LPG component, which is defined by a wavelength having a peak transmission loss, is designed to be shifted by a temperature change according to said increased temperature dependency of said LPG component.

4. The LPG component according to claim 3, wherein said central wavelength of said LPG component is designed to be shifted at a rate of approximately 0.25 nm per degree in centigrade.

5. The LPG component according to claim 3, wherein said central wavelength of said LPG component is designed to be shifted at a rate of at least 0.25 nm per degree in centigrade.

* * * * *